US012097537B2

(12) United States Patent
Seabrook et al.

(10) Patent No.: US 12,097,537 B2
(45) Date of Patent: Sep. 24, 2024

(54) SOLVENT CONTAINMENT AND PROCESS INTERLOCKING SYSTEM

(71) Applicant: Vitalis Extraction Technology Inc., Kelowna (CA)

(72) Inventors: James Anthony Seabrook, West Kelowna (CA); Raymond Brown, Kelowna (CA); Chelsea Walker, West Kelowna (CA)

(73) Assignee: Vitalis Extraction Technology Inc., Kelowna (CA)

( * ) Notice: Subject to any disclaimer, the term of this patent is extended or adjusted under 35 U.S.C. 154(b) by 292 days.

(21) Appl. No.: 17/727,665

(22) Filed: Apr. 22, 2022

(65) Prior Publication Data

US 2022/0339680 A1 Oct. 27, 2022

Related U.S. Application Data

(60) Provisional application No. 63/178,695, filed on Apr. 23, 2021.

(51) Int. Cl.
*B08B 15/02* (2006.01)

(52) U.S. Cl.
CPC .................................. *B08B 15/023* (2013.01)

(58) Field of Classification Search
None
See application file for complete search history.

(56) References Cited

U.S. PATENT DOCUMENTS

| | | | | | |
|---|---|---|---|---|---|
| 4,497,242 | A | * | 2/1985 | Moyer | F24F 11/77 454/61 |
| 4,514,936 | A | * | 5/1985 | Hurtado | B23Q 11/0046 15/301 |
| 4,528,898 | A | * | 7/1985 | Sharp | B08B 15/023 454/61 |
| 4,625,627 | A | | 12/1986 | Livanos et al. | |
| 5,035,269 | A | * | 7/1991 | Pytryga | F17C 13/085 414/490 |
| 5,265,465 | A | * | 11/1993 | Thomas | B65D 90/503 73/40.7 |
| 5,329,463 | A | | 7/1994 | Sierk et al. | |
| 5,343,908 | A | * | 9/1994 | Furstenberg | B65D 90/38 220/585 |

(Continued)

FOREIGN PATENT DOCUMENTS

| | | | | | |
|---|---|---|---|---|---|
| CN | 201195165 | Y | * | 2/2009 | B08B 15/02 |
| CN | 113926821 | A | * | 1/2022 | B01D 53/04 |

(Continued)

*Primary Examiner* — Joseph A Dillon, Jr.

(57) ABSTRACT

A solvent containment and solvent handling process interlocking system is described that can be used as a ventilation and spill management system for the storage and use of hazardous and volatile chemicals and solvents in an ordinary or non-hazardous location. The vented solvent containment system has a containment tray for secondary solvent containment and air regulatory to supply negative air pressure to draw in any evaporated solvent from the containment tray to a safe exhaust location. A safety sensor in the solvent containment system is interlocked with the solvent handling and solvent control system to slow or stop solvent flow in the event of a potentially hazardous solvent leak.

18 Claims, 12 Drawing Sheets

(56) References Cited

U.S. PATENT DOCUMENTS

| | | | | | |
|---|---|---|---|---|---|
| H1477 | H * | 9/1995 | Payne | B65F 1/1426 | 405/129.57 |
| 6,192,919 | B1 * | 2/2001 | Jackson | F17C 7/00 | 137/315.01 |
| 7,048,199 | B2 * | 5/2006 | Melink | F24F 11/64 | 126/299 R |
| 7,422,038 | B2 * | 9/2008 | Boler, Jr. | A47L 13/51 | 137/313 |
| 7,565,773 | B1 * | 7/2009 | Romig | E04H 5/02 | 588/259 |
| 7,866,312 | B2 * | 1/2011 | Erdmann | F24C 15/2042 | 126/299 F |
| 8,357,304 | B2 * | 1/2013 | Reich | G01M 3/226 | 73/31.06 |
| 9,383,064 | B2 | 7/2016 | Olander et al. | | |
| 10,337,751 | B2 | 7/2019 | Lieberman | | |
| 10,683,199 | B2 | 6/2020 | Stumpf | | |
| 11,541,329 | B2 * | 1/2023 | Seabrook | B01D 11/0203 | |
| 11,806,640 | B2 * | 11/2023 | Seabrook | B01J 3/008 | |
| 11,819,716 | B2 * | 11/2023 | Atkinson | A62C 37/08 | |
| 2004/0014417 | A1 * | 1/2004 | Katz | F24F 11/0001 | 454/62 |
| 2013/0337737 | A1 | 12/2013 | DeVarney et al. | | |
| 2019/0079418 | A1 * | 3/2019 | Lin | G03F 7/70858 | |

FOREIGN PATENT DOCUMENTS

| | | | | |
|---|---|---|---|---|
| CN | 116585643 A | * 8/2023 | | |
| DE | 825464 C | * 12/1951 | | |
| EP | 2682667 A2 | 1/2014 | | |
| WO | WO-2013150684 A1 | * 10/2013 | A01K 1/031 | |
| WO | 2020216995 A1 | 10/2020 | | |

* cited by examiner

SOLVENT CONTAINMENT AND PROCESS INTERLOCKING SYSTEM

CROSS-REFERENCE TO RELATED APPLICATIONS

This application claims priority to U.S. provisional patent application 63/178,695 filed on 23 Apr. 2021, which is hereby incorporated by reference herein in its entirety.

FIELD OF THE INVENTION

The present invention pertains to the field of ventilation and exhaust management and safety during solvent and volatile fluid chemical handling. More particularly the present invention relates to a ventilated solvent containment system or containment skid and cabinet for providing a ventilation and spill management system for solvent and volatile chemical containers and solvent lines in open work areas or areas that have not been classified or equipped as hazardous work areas.

BACKGROUND

Ventilation and spill management systems are used in the safe handling of solvents, spillable liquids, volatile chemicals, flammable and combustible materials, and other toxic chemicals. Various building and fire protection codes provide restrictions and guidelines on the transport, use, and storage of volatile chemicals to mitigate fire, contamination, corrosion, and explosion hazards, and to generally control the inadvertent or excessive release of volatile chemicals into the environment. Containment regulations for volatile chemicals generally involve both spill containment and ventilation requirements to provide adequate protection to people, property, and the environment in the location of the chemical. Properly designed, constructed, and ventilated containment areas are important for confining and controlling volatile and combustible leaks, spills, residues, or deposits and to discharge any vapours to a safe location, reducing the likelihood of fire, contamination, or explosion.

Liquid solvents are used in a variety of industrial applications including for coatings, paints, lubricants, adhesives, cleaning, extraction and chromatography processes, hydrocarbon extraction and processing, and chemical synthesis. In the pharmaceutical industry in particular, solvents are to dissolve poorly soluble molecules for use in, for example, synthesis, extraction, screening, purification, and formulation. Solvents have also found applications in environmental chemistry and are known as effective countermeasures against pollutant non-aqueous phase liquids, as well as in the production of functional energy materials and synthesis of biodiesel.

While using solvent in an industrial process, each room, section, or area of the facility needs to be considered individually in determining its ventilation requirements. Adherence to, for example, National Fire Protection Association (NFPA), International Building Code (IBC), and International Mechanical Code (IMC) guidelines, as well as local and regional Occupational Health and Safety guidelines, is required to safely operate the system. In industry, venting and containment systems, such as fume hoods and industrial scale air flow and evacuation systems have been traditionally used to maintain air flow requirements of hazardous cosolvents. In an example of a ventilation system, U.S. Pat. No. 10,337,751 to Lieberman describes an extraction room and ventilation system with opposing supply and exhaust systems that provide a laminar type air flow configured to transmit fresh air flow to said extraction room. In an example of a gas containment system, U.S. Pat. No. 9,383,064 to Olander et al. describes a ventilation gas management system having an enclosure adapted to contain fluid supply vessels and through which ventilation gas is flowed to provide safe operation in the event of leakage of fluid from a vessel.

A hazardous location is generally defined as an area where fire or explosion hazard may exist due to flammable gases or vapors, flammable liquids, combustible dust, or ignitable fibers or flyings. Hazardous locations are classified for the purpose of ensuring the safe and proper specification and safe installation and operation of electrical and electronic equipment and for the regulation of ventilation standards to protect people, property, and the environment. An ordinary location is understood to be a location that is other than a hazardous location. In industrial applications where it is desirable to use a solvent or hazardous chemical in a space not deemed to be a hazardous location, there remains a need for a safe solvent containment, ventilation, and spill management system to enable volatile and hazardous chemicals to be stored and used safely.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a solvent containment, ventilation and spill management in a process interlocking system to enable volatile and hazardous chemicals to be stored safely in an ordinary location. Another object of the present invention is to provide a vented containment skid for solvent containment and ventilation in an ordinary location.

In an aspect there is provided a solvent containment system comprising: a vented cabinet comprising cabinet sidewalls and a cabinet top wall; a liquid containment tray positioned below the vented cabinet comprising a tray base and tray sidewalls for enclosing a maximum liquid containment volume, at least part of the liquid containment tray fluidly connected to the vented cabinet; at least one aperture above the maximum liquid containment volume of the containment tray for receiving ambient air into the vented cabinet; a ventilation duct at or near the top of the vented cabinet connected to an air flow regulator to draw the ambient air through the at least one aperture into the vented cabinet and out the ventilation duct to an exhaust system; at least one solvent handling component inside the vented cabinet; a solvent control system connected to the at least one solvent handling component, the solvent control system capable of controlling solvent flow in the solvent handling component; and a safety sensor interlocked with the solvent control system such that a signal from the safety sensor indicating a potentially hazardous condition in the solvent containment system is sent to the solvent control system to mitigate the potentially hazardous condition.

In an embodiment, the safety sensor is one or more of an air flow sensor, fluid level sensor, moisture sensor, temperature sensor, ultrasonic sensor, door sensor, and chemical sensor.

In another embodiment, the solvent containment further comprises one or more of a asphyxiate gas dispenser and a neutralizer dispenser.

In another embodiment, the air flow regulator is capable of negative air flow velocities above the containment tray at least about 100 cubic feet per minute.

In another embodiment, the safety sensor detects one or more of electrostatic discharge, moisture, containment tray fluid level, presence of solvent, temperature, an open door in the vented cabinet, light, and air flow velocity.

In another embodiment, the solvent containment further comprises a support structure inside the vented cabinet capable of supporting the at least one solvent handling component.

In another embodiment, the solvent containment further comprises a support surface extending between the sidewalls of the containment tray, the support surface comprising a plurality of apertures.

In another embodiment, the support surface is outside of the vented cabinet and ambient air is directed through the plurality of apertures into the containment tray. In another embodiment, the support surface is capable of supporting a solvent container.

In another embodiment, the apertures of the support surface comprise one or more perforation apertures, gap apertures, and mesh surfaces.

In another embodiment, the solvent containment further comprises an air flow control system to control the air flow regulator.

In another embodiment, the maximum liquid containment volume of the containment tray is greater or equal to the solvent handling component total solvent volume capacity.

In another aspect there is provided a method of solvent containment comprising: containing a solvent handling component inside a vented cabinet; monitoring an environmental factor inside the vented cabinet with at least one safety sensor; controlling solvent flow in the solvent handling component with a solvent control system interlocked with the at least one safety sensor; and when the safety sensor detects a potentially hazardous condition, electronically sending a signal to the solvent control system to mitigate the potentially hazardous condition.

In an embodiment, the safety sensor detects one or more of electrostatic discharge, moisture, spill tray fluid level, presence of solvent, temperature, light, an open door in the vented cabinet, and air flow velocity.

In another embodiment, the safety sensor is monitoring continuously when solvent is flowing in the solvent handling component.

In another embodiment, the solvent handling component is a solvent pump, solvent tank, solvent conduit, valve, valve manifold, extraction column, or chromatography column.

In another embodiment, mitigating the potentially hazardous condition comprises increasing air flow velocity to the vented cabinet.

In another embodiment, mitigating the potentially hazardous condition comprises slowing or stopping solvent flow in the solvent handling component. In another embodiment, the method further comprises waiting until the safety sensor no longer detects the potentially hazardous condition, resetting the solvent control system, and reenabling solvent flow in the solvent handling component.

In another aspect there is provided a vented containment skid comprising: a containment tray comprising a base and sidewalls enclosing a volume and an open top; a support surface extending between the sidewalls of the containment tray, the support surface comprising a plurality of apertures; a ventilation duct in fluid connection with the containment tray; and an air flow regulator fluidly connected to the ventilation duct to create a negative air flow through the support surface, into the containment tray, and through the ventilation duct to an exhaust system.

In an embodiment of the vented containment skid, the support surface is capable of supporting a solvent container.

In another embodiment of the vented containment skid, the support surface comprises at least one plate.

In another embodiment of the vented containment skid, the air flow regulator is connected to a control system to adjust the air flow.

In another embodiment of the vented containment skid, the apertures of the support surface comprise one or more perforation apertures, gap apertures, or mesh surfaces.

In another embodiment of the vented containment skid, the air flow regulator comprises one or more fan, turbine, vacuum pump, and blower.

In another embodiment, the vented containment skid further comprises base supports attached to the containment tray.

In another embodiment of the vented containment skid, the base supports enable sliding relocation of the vented containment skid.

In another embodiment, the vented containment skid further comprises a cabinet in fluid connection with the contamination tray and the ventilation duct.

In another embodiment of the vented containment skid, the air flow above the support surface is at least 50 cubic feet per minute.

In another embodiment, the vented containment skid further comprises an air flow control system to control the air flow regulator.

In another embodiment of the vented containment skid, the air flow control system is electrically coupled with a solvent supply control system.

BRIEF DESCRIPTION OF THE FIGURES

For a better understanding of the present invention, as well as other aspects and further features thereof, reference is made to the following description which is to be used in conjunction with the accompanying drawings, where.

DETAILED DESCRIPTION OF THE INVENTION

Figure 1:
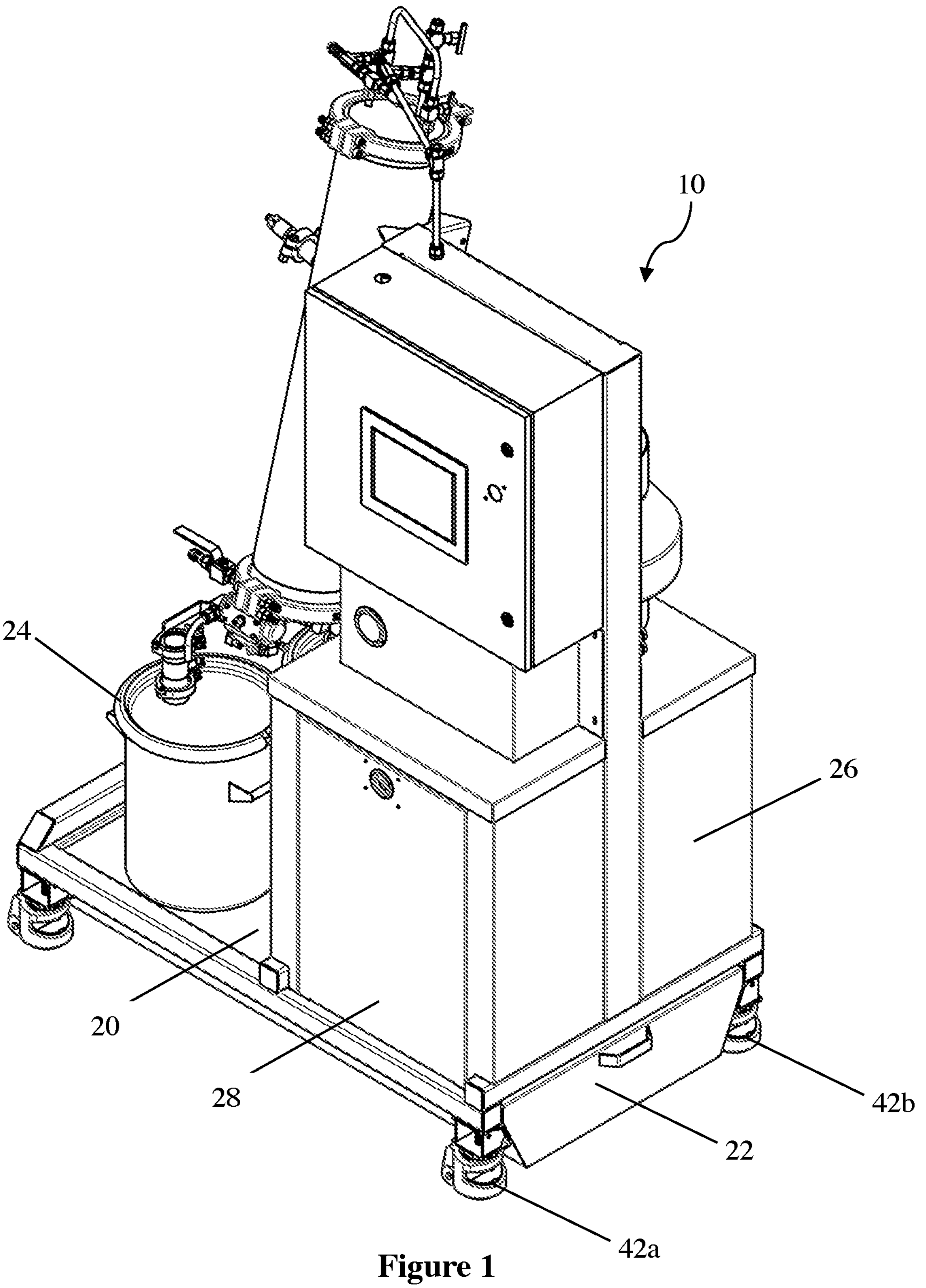
FIG. 1 is a front isometric view of a solvent containment system with a cabinet on a containment skid.

Unless defined otherwise, all technical and scientific terms used herein have the same meaning as commonly understood by one of ordinary skill in the art to which this invention belongs.

As used in the specification and claims, the singular forms “a”, “an” and “the” include plural references unless the context clearly dictates otherwise.

The term “comprise” and any of its derivatives (e.g. comprises, comprising) as used in this specification is to be taken to be inclusive of features to which it refers, and is not meant to exclude the presence of any additional features unless otherwise stated or implied. The term “comprising” as used herein will also be understood to mean that the list following is non-exhaustive and may or may not include any other additional suitable items, for example one or more further feature(s), component(s) and/or element(s) as appropriate. The terms “having”, “including” and “containing”, and grammatical variations thereof, are inclusive or open-ended and do not exclude additional, unrecited elements and/or method steps. The term “consisting essentially of” when used herein in connection with a composition, device, article, system, use, or method, denotes that additional elements and/or method steps may be present, but that these additions do not materially affect the manner in which the recited composition, device, article, system, method, or use functions. A composition, device, article, system, use, or method described herein as comprising certain elements and/or steps may also, in certain embodiments, consist essentially of those elements and/or steps, and in other embodiments consist of those elements and/or steps, whether or not these embodiments are specifically referred to.

As used herein, the term “about” refers to an approximately +/−10% variation from a given value. It is to be understood that such a variation is always included in any given value provided herein, whether or not it is specifically referred to. The recitation of ranges herein is intended to convey both the ranges and individual values falling within the ranges, to the same place value as the numerals used to denote the range, unless otherwise indicated herein.

The use of any examples or exemplary language, e.g. “such as”, “exemplary embodiment”, “illustrative embodiment” and “for example” is intended to illustrate or denote aspects, embodiments, variations, elements or features relating to the invention and not intended to limit the scope of the invention.

As used herein, the terms “connect” and “connected” refer to any direct or indirect physical association between elements or features of the present disclosure. Accordingly, these terms may be understood to denote elements or features that are partly or completely contained within one another, attached, coupled, disposed on, joined together, in communication with, in fluid communication with, electrically joined to, operatively associated with, etc., even if there are other elements or features intervening between the elements or features described as being connected.

As used herein the term “supercritical fluid” refers to a fluid wherein the fluid can exist in a supercritical condition with no clear distinction between vapour and liquid states, or combination of both vapour and liquid states. In a supercritical state, the fluid is at a temperature and pressure above its critical point, where distinct liquid and gas phases do not exist, but below the pressure required to compress it into a solid. Generally supercritical conditions for carbon dioxide, for example, exist above 7.38 MPa (1070 psi) and above 31.1 degrees centigrade (88° F.). The term “superfluid” encompasses both supercritical fluids and subcritical fluids.

As used herein, the term “hazardous location” is a term of art defined and classified by safety and regulatory authorities as a location where flammable liquids, gases or vapors or combustible materials exist in sufficient quantities to produce an explosion or fire and where ventilation, electrical, and safety systems have been designed and installed to accommodate the presence of these materials. In hazardous locations, specifically designed equipment and special installation techniques must be used to protect against the explosive and flammable potential of these substances. The designation of hazardous location can vary between jurisdictions, however each jurisdiction will have a variety of fire, safety, electrical, and other regulations which are required to be satisfied for building, maintenance, and use of hazardous materials in these locations.

As used herein, the term “ordinary location” refers to a room, building, or location that is not classified as a hazardous location and is not equipped with the specifically designed equipment or ventilation systems required under safety guidelines and regulations for the use and storage of hazardous, volatile, and flammable chemicals.

Described herein is a solvent containment and process interlocking system that provides safe liquid solvent handling, storage, and containment in an ordinary location. The presently described solvent containment and process interlocking system provides a safe solvent containment, ventilation, and spill management system enable volatile and hazardous chemicals to be stored and used safely in a non-hazardous location. Also described herein is a vented solvent containment skid that can be used as a ventilation and spill management system for the storage and use of hazardous and volatile chemicals and solvents in an ordinary or non-hazardous location. The present vented containment skid provides adequate fluid containment as well as ventilation to satisfy safe chemical and solvent storage and use regulations to enable volatile and hazardous chemicals to be stored and used safely in an ordinary location. The vented solvent containment skid can be mobile and comprise wheels or a palette based that can be easily moved with a palette truck or jack, or can be substantially immobile such as a stationary cabinet.

By providing an exhaust system, spill containment system, and process interlocking system in a single installation, the present solvent containment system and vented containment skid provides adequate air capture velocity to satisfy ventilation safety and workplace regulations for hazardous chemicals and solvents to ensure safe handling of flammable solvents in an indoor space that has not been equipped with the specifically designed equipment or ventilation systems required under safety guidelines and regulations for the use and storage of hazardous, volatile, and flammable chemicals. The present solvent containment system and vent skid also provides sufficient local exhaust ventilation to prevent dispersion into the air of dusts, fumes, mists, vapors, and gases in concentrations causing harmful exposure. Managing exhaust air flow operations of solvent allows industrial solvent processes to be carried out under the location category of 'ordinary location' (i.e. hazardous classification not required). Further, effective exhaust air and containment management protects laboratory and technical personnel from solvent exposure and lowers the risk of fire and explosion.

In accordance with hazardous materials handling, buildings or portions of buildings using flammable solvents used in processing are be required to install a flammable gas/vapour detection system in the area where such gases may be present that is suitable for detecting the types of gases used in the process. By encasing the solvent containers inside a vented containment system equipped with a solvent detection system this materials handling requirement can be met without retrofitting the entire room with hazardous materials ventilation equipment. Air flow regulation is accomplished in the solvent containment system by electrically connecting or coupling, also referred to as interlocking, the power for the ventilation system and the power for the control panel with the solvent control system. With adequate ventilation, spill containment capacity, and mechanical-electrical interlocking with solvent handling equipment and components, the present ventilation system can offer a regulatory compliance solution for ordinary locations. In particular, the vented exhaust system in the solvent containment system draws air from the solvent storage area directly to the outside of the building. Combined with adequate secondary fluid containment in the form of a solvent containment tray, air flow requirements and safety standards are met. With adequate make up air supplied to the room the present solvent containment and process interlocking system provides an alternative safe solvent handling device for solvent use and storage in an ordinary location.

The term "interlocking" is used in Engineering processes to refer to a feature that makes the state of two mechanisms or functions mutually dependent. An interlock can also be thought of as a hardware that stalls or stops a process pipeline when a hazard is detected until the hazard is cleared. In the present process, an interlock of solvent detection inside the solvent containment system using a solvent detector is interlocked with the solvent supply and control process such that the solvent supply and handling devices can be managed or shut off if an unsafe level of solvent is detected inside or outside the solvent cabinet. In this way solvent leaks can be detected early to avoid solvent buildup events that may pose a safety hazard.

FIG. 1 is a front isometric view of a solvent containment system with a cabinet on a containment skid. The vented containment skid, also referred to herein as a solvent containment system 10, is shown in combination with a cosolvent injection system for a superfluid extraction system, however it is understood that the same could be used for any equipment, machinery, or storage requirement where storage and/or use of a hazardous or volatile chemical fluid in an ordinary location is desired. Containment tray 22 has a volume sufficient to contain spillage from solvent tank 24 and also acts as a conduit to draw any solvent exhaust or vapor from around the solvent tank 24 or equipment above the containment tray into the ventilation and spill management system. The one or more solvent tank 24 is supported on a vented support surface 20, which comprises a plurality of air flow conduits, such as perforations, holes, gaps at the perimeter or junction location, or has an open and vented surface to allow any spilled solvent as well as any escaped solvent vapor to flow into the containment tray 22. In fluid communication with or fluidly connected with the vented support surface 20 of the containment tray 22 is a closed vented cabinet 26 which has side walls, a cabinet top, and optionally one or more cabinet door 28 for access thereto. The vented cabinet 26, along with at least a portion of the cabinet base, is fluidly connected to the containment tray 22 to form a generally air-tight structure to direct air flow through the containment tray 22 and vented cabinet 26 and out through a ventilation duct which is connected to a ventilation system to a suitable exhaust location. The vented cabinet 26 can be empty, or can contain one or more fluid conduits and/or solvent handling components such that escape of any hazardous fluid or vapor from the fluid conduits and/or solvent handling components contained therein can be contained by the containment tray 22 and air ventilation system. Vented cabinet 26 can also be used to store one or more solvent containers or solvent-containing equipment such as pumps and associated conduits. Base supports 42*a*, 42*b* mounted or connected to the bottom corners of the vent skid (and two at the other corners, not labeled) can provide additional support for the solvent containment system 10 and can comprise, for example, feet, caster wheels, adjustable or lockable supports, or any other supports known in the art. The solvent containment system 10 can also comprise any number of base supports as needed to support the solvent containment system 10, for example, stably on a floor. In one preferred embodiment where the solvent containment system is a mobile skid, the tray supports can comprise lockable caster wheels to allow sliding motion of the solvent containment system 10. Depending on the type of use, and size of the vent skid the number and size of the wheels may vary. In another embodiment, the vent skid can be moved by a motorized vehicle or with motorized wheels.

The solvent containment system of the present invention can be used to control and regulate air flow around equipment where hazardous solvents vapours are generated or used, such as around solvent flow lines and high pressure solvent flow systems. In particular, encapsulation of solvent in secondary containment systems with ventilation as well as encapsulation of solvent transport lines in connected vent encapsulation can ensure adherence to safety regulations for the use and transport of hazardous fluids. To comply with IMC regulations, specifically Chapter 5 (Exhaust Systems): Section 503 (Motors and Fans), the power for a solvent supply system must be interlocked with the ventilation system so that the solvent supply system can only be operated if the ventilation system is running. This can be accomplished by electrically coupling the power for the ventilation system and the power for an associated solvent supply system. Ensuring that proper ventilation is present while solvent or hazardous chemicals are in the room enables safe operation of a solvent system without the need for a hazardous room classification. In high pressure systems, the present vent skid can be used to capture any released solvent fluid or vapor at the point of generation and discharge it to a remote or outdoor location to maintain a hazard-free environment in and around the equipment and indoor area. Due to the high velocity air flow generated above the vent skid through the support surface 20 and through the vented cabinet 26, the vent skid is capable of being used for storing and transporting solvent and flammable fluids in areas generally not approved for solvent containment.

The present solvent containment system is further designed to meet all regulatory solvent handling safety requirements such that solvents can be handled inside the solvent containment system placed in an ordinary location. All sources of potential ignition, such as electrostatic charge and thermal buildup, can be eliminated or adequately controlled inside the vented cabinet 26 and safety sensors to detect hazardous situations are connected by interlock to the solvent control system. Metallic or conductive containers used to transfer or move flammable liquids can be electrically bonded to each other or electrically grounded while their contents are being transferred from one container to the other in accordance with solvent handling regulations. This grounding can be accomplished, by example, through a support structure inside the vented cabinet or on the support surface that is used to support the solvent containing components. The solvent containment system can also be fitted with one or more asphyxiate gas dispenser or non-flammable gas sources, such as a carbon dioxide or nitrogen source, that can be injected into the solvent cabinet in the rare case of fire. Additionally, the solvent containment system can also be fitted with one or more integrated neutralizer dispenser. For example, if the vented cabinet contains a strong base or strong acid, the neutralizer dispensing system can discharge neutralizing agent into the cabinet in the event of a solvent leak.

Figure 2:
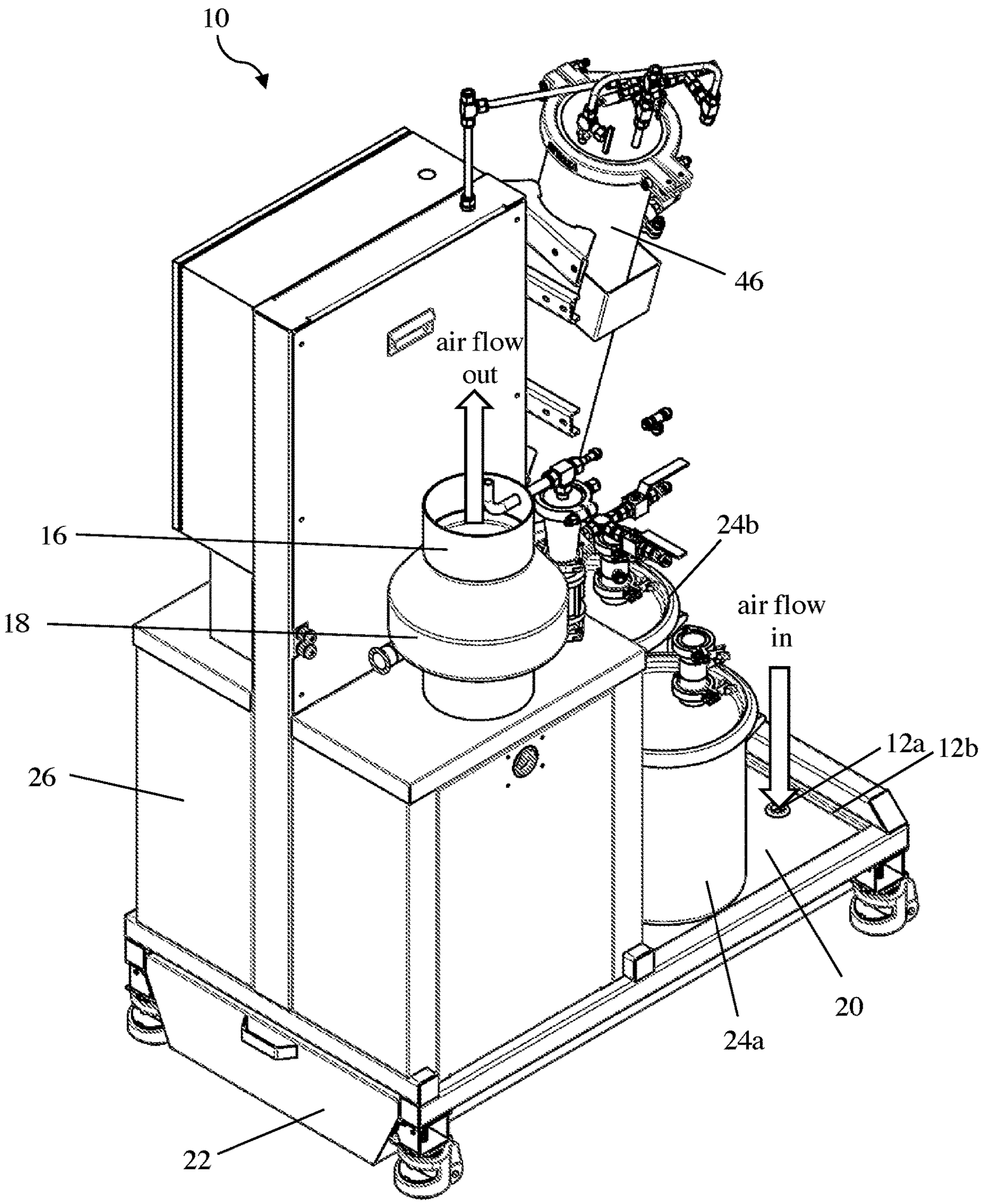
FIG. 2 is a rear isometric view of solvent containment system with a cabinet on a containment skid.

FIG. 2 is a rear isometric view of a solvent containment system 10 with a vented cabinet 26 on a containment skid. A containment tray 22 has a support surface 20 with round solvent apertures 12*a* as well as elongated solvent apertures 12*b* at the intersection points of the support surface with supporting features in the solvent containment tray 22. Solvent tanks 24*a*, 24*b* sitting on the support surface 20 are surrounded by air ventilation pulling surrounding ambient air downward and into the containment tray 22 and vented cabinet 26. The support surface 20 extends partially or completely over the open top of the containment tray 22. The support surface 20 can also be a mesh like structure with solvent apertures (not shown) on the surface, and the solvent apertures can be of any shape or to allow for flow of solvent and/or vapour to the containment tray 22. Air flow regulator 18 is fluidly connected to vented cabinet 26 through ventilation duct 16, which is connected to an air outflow duct system for the solvent exhaust to be discharged to a safe location, such as outdoors. The air flow regulator 18 may comprise, for example, one or more exhaust fan, vacuum, pump, or a like device capable of creating an air flow in the desired direction at a sufficient rate. Shown is a ventilation fan incorporated into the vent skid cabinet, however it is understood that one or more air flow generation and/or regulator devices may be in the cabinet itself, above the cabinet, attached to the containment tray 22, in the ventilation system attached to ventilation duct 16, or in any reasonable location to provide the required air flow volume.

The ventilation duct 16 is connected with an outflow ventilation duct system, which may also comprise one or more ventilation devices for creating air flow from the support surface 20 of the containment tray 22 through apertures 12, through the vented cabinet 26. The two arrows shown depict the direction of flow of solvent exhaust. The solvent exhaust enters the containment tray 22 via solvent apertures 12*a*, 12B present on top of support surface 20. The solvent exhaust then flows through the solvent containment tray 22 and vented cabinet 26 and to the ventilation duct 16 to be safely carried off to a remote location. The example shown comprises only one ventilation duct 16, however multiple ducts can also be envisaged. The diameter, design, and shape of the ventilation duct 16 can also be modified as desired provided the desired and/or required air flow volume above the support surface can be maintained. The vented cabinet 26 can also be fitted with one or more air flow conduits to create a negative pressure in one or more peripheral cabinets or secondary containment devices. The containment tray 22 can further be provided with one or more fluid outlet or drain to remove any collected solvent.

Strict air flow requirements exist for the control of flammable solvents in open areas. In an example of occupational work and safety regulations in British Columbia, Canada, (British Columbia Occupational Health & Safety Regulations OHS5.30) if a flammable liquid is dispensed or transferred inside a flammable liquids storage room the storage room must be mechanically ventilated at a rate of at least 18 $m^3$/hr per square metre (1 cfm/sq ft) of floor area but not more than 250 $m^3$/hr (150 cfm). Additionally, exhaust air must be discharged to the outdoors, and makeup air provided, and any makeup air duct passing through a fire separation must be equipped with an approved fire damper, and doors must be self-closing. By enclosing all solvent handling equipment within, above, or inside the present solvent containment system all solvent handling requirements can be easily met. Additionally, any door on the vented cabinet 26 which houses the solvent-handling components of the solvent containment system can also be interlocked with the solvent control system such that the door cannot be opened if the air flow requirements and solvent level requirements are not met. Stricter interlock rules can also be put in place such that any door in the vented cabinet 26 cannot be opened unless the solvent control system has limited or stopped solvent flow in the system. Additionally, the solvent containment system 10 may be designed such that all solvent handling components including the solvent tanks 24*a*, 24*b*, and other solvent handling components 46 are contained within the solvent cabinet.

Figure 3:
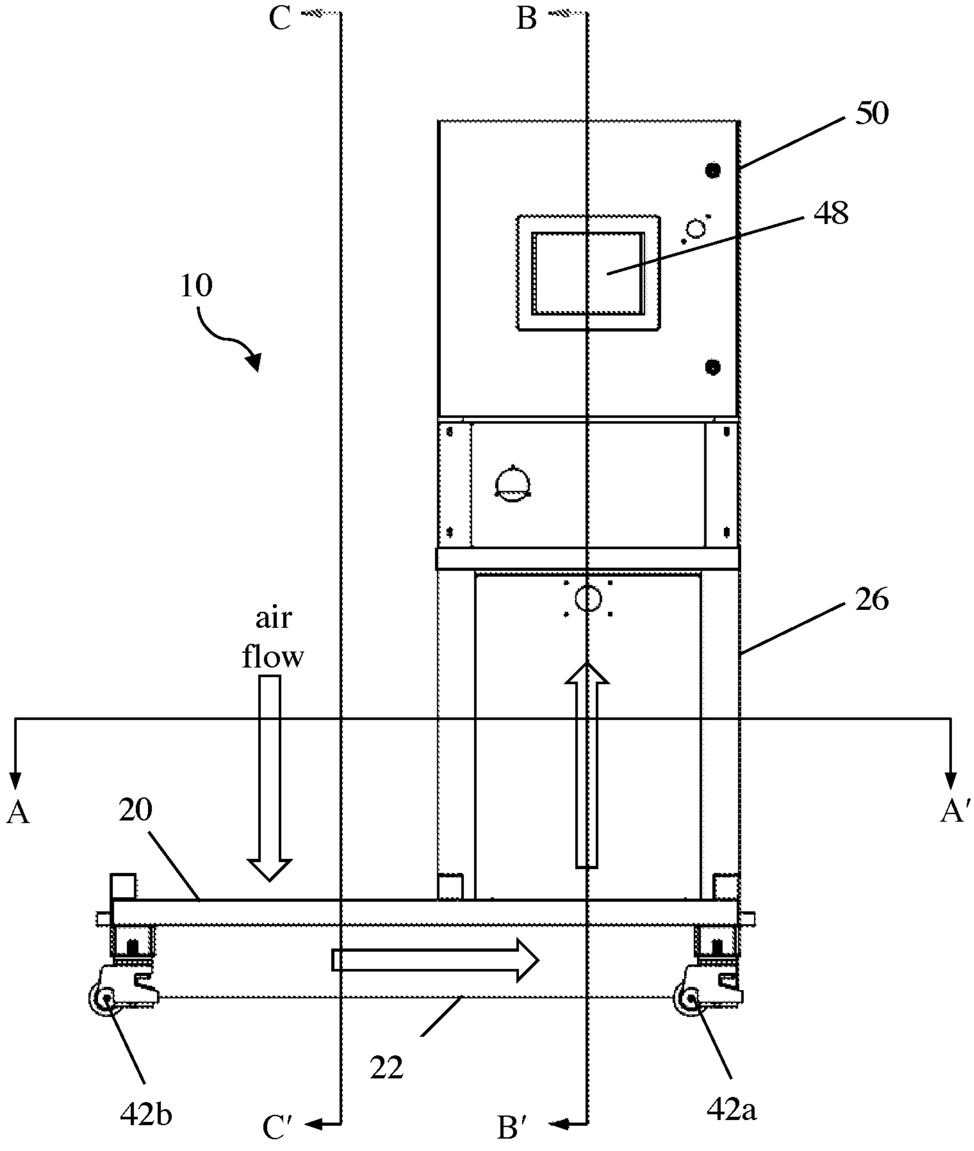
FIG. 3 is a front view of a mobile solvent containment system with a cabinet on a containment skid.

FIG. 3 is a front view of a mobile solvent containment system or vented containment skid 10 with a vented cabinet 26 and containment tray 22 mounted on caster wheel base supports 42*a*, 42*b* (with two others not shown). The solvent containment skid is designed to contain undesired spillage of solvent from a solvent container positioned above the vent skid, providing a spill containment pallet volume for secondary containment requirements without the need for a hazardous room classification. The vented containment skid is also designed to direct solvent exhaust flow from the area above it in downward direction to create a negative pressure around the surface of the containment cabinet where solvent is stored and used. Particularly, the vent skid regulates flow of solvent exhaust in the area directly above any open solvent containing elements and inside the solvent cabinet 26 by defining the direction of the solvent exhaust into the vent skid and out through an active ventilation system and air flow regulator(s). The air flow direction is shown with blocked arrows, with the ventilation system pulling room air through support surface 20 into the containment tray 22 and up through vented cabinet 26. The flow of air from the area on top of the support surface 20 is directed downward towards the containment tray 22 by a high velocity air flow regulator into a ventilation system fluidly connected to the containment tray 22 through vented cabinet 26. The ventilation system which draws air through the vented skid is connected through one or more ventilation duct to vent the air flow to an outdoor location.

The solvent containment system comprises an electronic control system comprising at least one microprocessor connected to an air flow sensor for monitoring the airflow inside the vented containment system to ensure that the system has adequate air flow to meet regulatory guidelines and for controlling the air flow regulator. Various air flow sensors can be used in the ventilation skid to ensure proper air flow and interlock with the solvent containment system and solvent flow process control. Some examples of air flow sensors include but are not limited to velometers, anemometers, vane sensor, hot wire sensors, cold wire sensors, and laminar flow sensors. Optional additional safety sensors can include chemical sensors and temperature sensors to detect leaked solvent and ensure that there is no safety hazard from increased temperature. The air flow control system of the solvent containment system can also be connected to the solvent control system to ensure that use of solvent in the solvent supply is restricted or shut off when air flow requirements are not met. The air flow control system and one or more associated microprocessor can be housed in a control box 50 above the vented cabinet 26.

A display panel 48 can provide data from the control system to a system operator to report on the ventilation system status and sensor readings. An output for the solvent control system can be displayed on display panel 48, and some or all of the control hardware for the solvent control system can be housed and protected in the control box 50. Control hardware comprises one or more processor, microprocessor, computer, or other computer hardware device containing operating instructions to execute the air regulation, solvent control, and sensor devices which are part of the solvent containment system 10. The display panel 48 can provide a human-machine interaction site on the solvent containment system to provide an indication of the set preferences, system status, and optional input control of the solvent control system and air flow control system. The system display screen or display panel 48 can also provide an interactive port for access and reporting from the control system to a human technician, and the same data can also potentially be sent to one or more peripheral or external computers, computing devices, or electronic components. The display panel 48 can further provide process information on the process progress, time to completion, and equipment operation parameters such as lower flammability limit (LFL) levels of any solvent(s) being used and air flow measurements through the containment tray 22 and/or vented cabinet 26. Actions can also be initiated by a technician from the control screen, such as draining specific equipment, valve control, drain sequences, solvent recovery protocols, interlock resetting, and drain protocols. Alarms and reminders can also be displayed and the system can confirm that certain technician checks have been done through the human machine interface. The control system, via the display panel on the solvent control system, can also provide information on the rates of solvent flow and supply, process run information, and solvent and process pressures. Data from the control system can also be collected and sent to one or more computing device for additional analysis, recording, or storage. The control system for the solvent containment system 10 can also comprise one or more communication ports, communication hubs, transceivers, or wired or wireless connections for sending data to interlock with the solvent control system. Additionally, data from the solvent control system and air flow control system can be sent to one or more computer, cloud, or other data processing or reporting system.

Vented cabinet 26 contains and protects one or more solvent handling components. Solvent handling components can include but are not limited to solvent containers, solvent tanks, valves, valve manifolds, solvent pumps, extractors, solvent mixing devices, chromatography columns, fluid lines, and conduit fittings, all of which can have mechanical, electrical, and electronic components for controlling the flow of solvent. The solvent handling components can be fluidly connected to one or more solvent supply tanks and to external systems, such as solvent extraction systems, via one or more valve manifolds. Vented cabinet 26 is ventilated to the exterior to exhaust any hazardous vapors, such as from the solvent, through a ventilation duct and ventilation conduits.

The power for the solvent control system, powered solvent handling components, and other mechanical components in the vented cabinet 26 can also be interlocked with the ventilation system such that the solvent control system can only be powered on if the air flow control system and other solvent detection and safety interlocks are running adequately. One or more air flow detectors in the vented cabinet 26 can provide feedback to ensure that the ventilation levels inside the vented cabinet are at or above required speed and/or air change volume. Regulations require minimum volumes of air flow in areas where solvent is used, and coupling or interlocking the air flow control in the vented cabinet 26 with the solvent control system ensures that when solvent is flowing an appropriate and safe level of ventilation is provided in the vented cabinet around the solvent-handling components. This can be accomplished, in one example, by electrically coupling the power for the air flow control system and the power for the solvent control system. Alternatively, other algorithmic methods of coupling one or more of the solvent sensors, air flow sensors, to the solvent control system can be done to adjust the air flow inside the vented cabinet in the case of detection of higher than expected solvent levels in the cabinet. Fires and explosions can happen when the solvent is at a high enough level in the presence of sufficient oxygen such that it will burn. Mechanical devices and systems can provide a source of ignition that can trigger a fire, such as an electrical spark, friction, static discharge, air stream, or thermal source. The most reliable way to prevent fire or explosion in an industrial setting when using flammable solvents is to continuously measure environmental factors and limit the amount of solvent liquid and vapor to a safe level.

The required capture velocity of a ventilation system for a particular chemical can be used to describe the air flow requirements for an exhaust to capture the specific hazardous, flammable, or volatile chemical. Each chemical has its own required capture velocity or minimum flow rate based on its volatility, which can be measured as the lower flammability limit (LFL) also referred to as the lower explosive limit (LEL) of a solvent, which is the lowest concentration (percentage) of a gas or a vapor in air capable of producing a flash of fire in the presence of an ignition source (arc, flame, heat). The safety limit of the chemical in air is generally determined to be the volume of air in cubic feet necessary to dilute the vapor from 1 gallon of solvent to 25 percent of the lower explosive limit. At a concentration in air lower than the LFL, gas mixtures are considered to be "too lean" to burn. To determine the volume of air in cubic feet necessary to dilute any solvent vapor to 25 percent of the lower explosive limit (LEL), also referred to as the lower flammable limit (LFL) the capture velocity of the surrounding area is calculated as the dilution volume required per gallon of solvent which is:

$$4(100-\text{LEL})(\text{cubic feet of vapor per gallon})+\text{LEL}$$

A table of LELs for common solvents and air flow volume requirements in cubic feet per gallon at 21° C. is shown in Table 1. A more comprehensive list of common solvents and their LELs and required capture velocities can be found in the United States Occupational Health and Environmental Controls Standard Number: 1926.57.

TABLE 1

LELs and required air volume of common solvents.

| Solvent | Air Volume (cubic feet per gallon of solvent) | LEL |
|---|---|---|
| Ethanol | 55.2 | 4.3 |
| Acetone | 44.0 | 2.6 |
| Ethyl Acetate | 40.0 | 3.1 |
| Methyl Ethyl Ketone | 36.0 | 1.8 |
| Toluene | 30.4 | 1.4 |

In accordance with occupational health and safety regulations, the concentration of flammable gas or vapor must not exceed 20% of the lower explosive limit (LEL). In the present solvent containment system, accurate and regular monitoring and air flow control can ensure that the amount of solvent released into the solvent cabinet or present above the containment tray does not exceed the regulatory maximum. The interlocked solvent control system can also stop solvent flow if safe levels cannot be achieved by normal means, indicating a leak in one or more of the solvent-handling components. In the solvent containment system as described, the concentration of flammable gas or vapor can be maintained, for example, below 20% in the solvent cabinet using sufficient air flow velocities from the ambient air in the room, through the cabinet, and out of the cabinet via a ventilation duct. An air flow regulator in the ventilation duct or ventilation system draws air from the room through the cabinet and an air flow control system preferably fitted with an air velocity sensor can ensure that the ventilation in the vented cabinet is adequate to prevent the accumulation of vapors at the required air flow velocity for the LEL of the particular solvent(s) contained in the cabinet to be below the required level. Further the air flow control system is preferably interlocked with the solvent control system operation such that if the air flow is less than required for a particular solvent as measured by the air flow sensor the solvent control system will reduce or stop the flow of solvent in the solvent containment system. Additionally, in the case of an abnormally high vapor percentage of solvent or failure of ventilation in the solvent cabinet, the solvent containment system can be flushed with an asphyxiate gas such as carbon dioxide, which is a fire extinguishing agent, to dilute the solvent and oxygen amounts in the solvent cabinet and prevent combustion. Any solvent and gas could then be safely vented to the exterior.

The present vented containment system can preferably achieve negative air flow velocities above the support surface and containment tray of at least 1 cfm and up to at least about 50 cfm and preferably 100 cubic feet per minute over the capture area (support surface) and the flow rate of the air flow regulator can be adjusted as desired to achieve the required air flow volume to direct flow of solvent exhaust from the capture support surface 20 to the ventilation and exhaust system. The air flow regulator can further be connected to a control system and one or more air flow sensors to monitor and adjust the flow rate of solvent exhaust through the support surface. Each air flow regulator in the system can also have a programmable set point and an acceptable range for the solvent exhaust flow above the solvent apertures 20. In one embodiment, depending on the detected air flow rate, the sensor output can induce a signal to be sent to the air flow regulator through the control system to raise or lower the air flow rate. In another embodiment the type and/or volume of solvent supported on the support surface can be input to the control system and the control system can regulate the air flow based on the LEL or LFL requirements of the solvent. Alternatively, the flow rate of the air flow regulator can be adjusted manually.

A chemical or solvent sensor inside or near the vented cabinet 26 can also be used to monitor solvent liquid levels and/or solvent vapor levels inside the cabinet. A variety of different types of sensors can be used as LEL monitors, such as catalytic sensors, infrared absorption sensors, flame ionization sensors, and flame temperature sensors. The sensor can take regular air samples inside the cabinet and determine the amount of solvent inside the air in the cabinet. Since the amount of solvent in the air outside of the cabinet where solvent is not being used is lower than the amount of solvent in the air inside the cabinet, sensor methods that use combustion are generally positioned outside of the cabinet to limit hazard that may be caused by the sensor itself. Other sensors that can be used to interlock with the solvent containment system include but are not limited to fluid level sensors, temperature sensors, and electrical buildup or discharge sensors. In a preferred embodiment an ultrasonic sensor is used as a fluid level sensor to measure change in the level of the containment tray.

The control system can also comprise visual and/or audible alarms that can indicate when the solvent containment and ventilation system is not operating within specification. This will also cause the interlock system to prevent the transfer or use of solvent until ventilation operation is restored. Further, if the ventilation capture velocity is less than the calibrated value for the specific type of solvent, the control system will trigger an alarm and cause the interlock system to prevent further operation of the unit until the correct capture velocity is restored. In another embodiment a LEL detector can be installed within the skid internal area and connected to the control system. Using predetermined LEL or LFL requirements of the selected solvent, the control system can regulate the air flow based on real time concentrations of solvent vapor within the ventilated solvent containment system.

The present solvent containment system or ventilated containment skid can be used, for example, in a cosolvent system for superfluid extraction and chromatography systems for the extraction of desirable oils from plants. Ethanol in particular is used as a cosolvent in a carbon dioxide extraction of cannabinoids and has been found to increase the efficiency of the exaction process by significantly reducing extraction cycle time and improving operational efficiencies. Ethanol is classified as a “Flammable Liquid: Category 1 or 2 depending on formulation” by the National Fire Protection Association (NFPA), thus stringent adherence to ventilation guidelines to ensure effective capturing of ethanol vapours at the point of generation and safe discharge to outdoors needs to be maintained. The maximum allowable supply container of ethanol permitted within a standard extraction room is 55 gallons and the spill containment area (max 55 gallons of solvent) should be 84 $ft^2$ (110"×110") or less. The spill containment area for ethanol must always maintain adequate ventilation when ethanol is present, even if the ethanol is in a closed container. The current vent skid regulates exhaust flow to ensure adequate dilution of ethanol vapors, preferably below 25% of the lower flammability limit (LFL), and confines ethanol vapors to the area in which they are generated by way of the high air flow above the containment tray 22.

Figure 4:
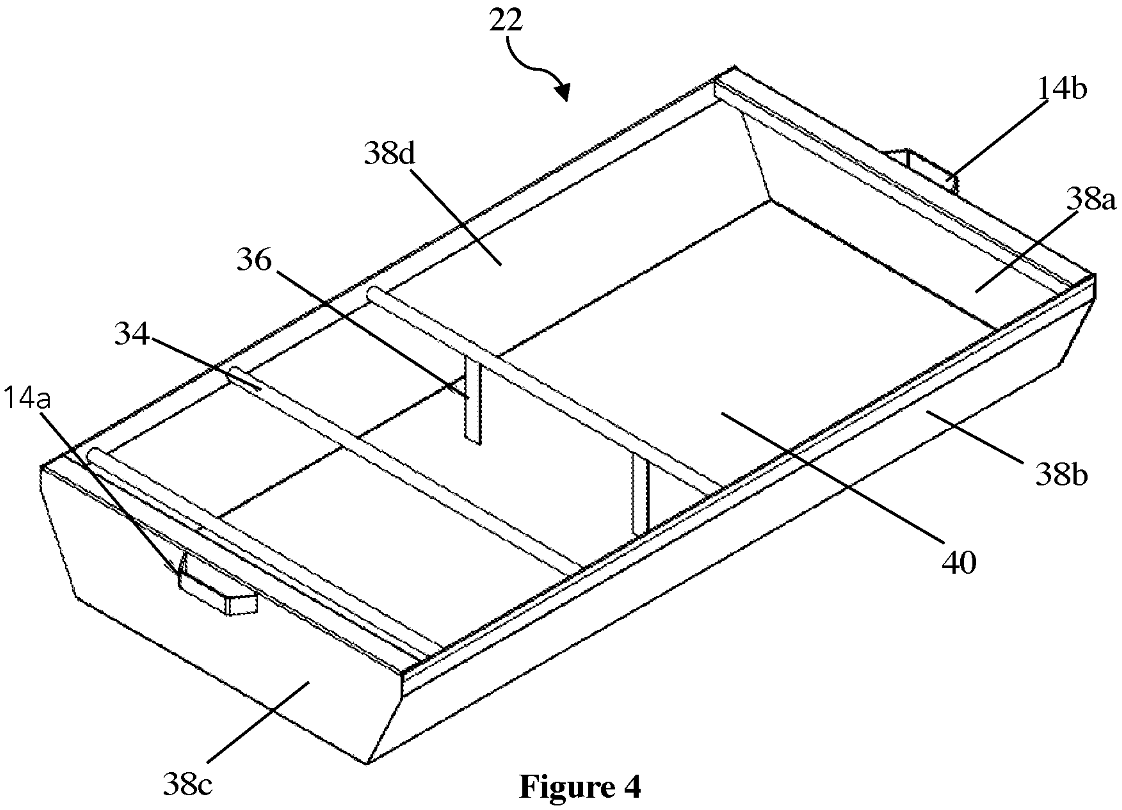
FIG. 4 is an isometric view of a solvent containment tray for a solvent containment system.

FIG. 4 is an isometric view of a solvent containment tray 22 for a vented solvent containment system. The solvent containment tray 22 serves as a secondary containment system for solvent containers sitting on the support surface, and the volume defined between the base 40 and sidewalls 38*a*, 38*b*, 38*c*, 38*d* of the containment tray 22 should be sufficient to contain any inadvertently spilled or leaked solvent and made from a material and in a construction such that it can contain any spilled fluid without leakage. The containment tray 22 can be integral with the base of the vent skid, or alternatively the base of the vent skid can comprise a frame for receiving the containment tray 22 such that the containment tray can slide into position in the frame. One or more handle 14*a*, 14*b* on the containment tray 22 can be used to move the solvent containment system, or, if slidable, to slide the containment tray in the frame of the solvent containment system. An optional horizontal support bar 34 extending between opposite sidewalls 38*b* and 38*d* (or 38*a* and 38*c*) of the containment tray 22 can provide additional support to the containment tray as well as a support structure for holding one or more mesh or grill structures inside of or on top of the containment tray to provide the support surface. Preferably each horizontal support bar 34 is connected to at least one vertical support bar 36 extending from the horizontal support bar 34 to base 40 of the containment tray 22 to provide additional support. Three horizontal support bars are shown aligned parallel to each other extending between side walls of the containment tray 22 to provide support for one or more surface plates which serve as a support surface for one or more solvent containers on the support surface of the vented skid, however it is understood that any number of support bars in any desired orientation may be used, and may also be at a non-normal angle to the sidewalls. The support bars can be made from metal or solvent-resistant polymer, or any other appropriate materials that provided non-reactive as well as structural properties for supporting the solvent containment tray 22. The containment tray 22 may also be subdivided into two or more containers or regions to contain any spills from above into a smaller area.

Figure 5:
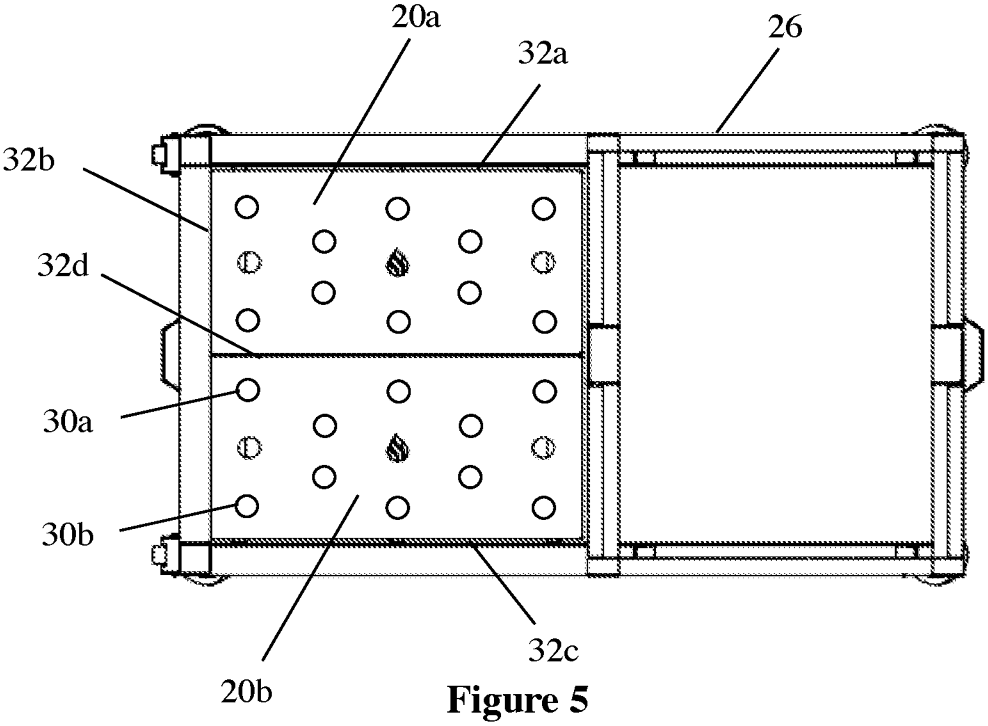
FIG. 5 is a top view of a solvent containment tray for a mobile vented solvent containment system.

FIG. 5 is a top view of a solvent containment tray for a mobile vented containment skid through section A-A' from FIG. 3. In one embodiment the support surface 20*a*, 20*b* can be comprised of one or more plates with a plurality of perforation apertures 30*a*, 30*b* for providing a drain for any solvent that has leaked onto the support surface. Between plates of the support surface 20*a*, 20*b* gap apertures 32*a*, 32*b*, 32*c*, 32*d* at the perimeter of plates and/or between plates can also provide additional sites of solvent or fluid drain. The plates on the support can also be supported by horizontal and vertical support bars as previously described in order to have sufficient strength to support heavy solvent containers and other equipment. Although the support surface shown comprises two plates, it is understood that similar support surfaces can be made of one, two, or more than two plates, or of one or more pieces of a three-dimensional mesh or structure that either sits on the bottom of the containment tray or is supported inside of the containment tray but still offers adequate air to be sucked into the ventilation system through the support surface and vented cabinet 26. These may include, for example, hexagonal or square solid mesh structures having a thickness sufficient to strength the structure but allow air flow through the mesh. The support surface can be of any material that provides solvent and corrosion resistance and has sufficient structural integrity to support any solvent tanks and/or equipment for placement or mounting thereon, such as, for example, steel, aluminum, or a chemically resistant polymer such as polyethylene. The apertures in the support surface 20 can be comprised by a variety of designs that enable both support of tanks and equipment as well as air flow. In one embodiment the support surface can comprise one or more removable grates, perforated plates, mesh surfaces, or a combination thereof.

Figure 6:
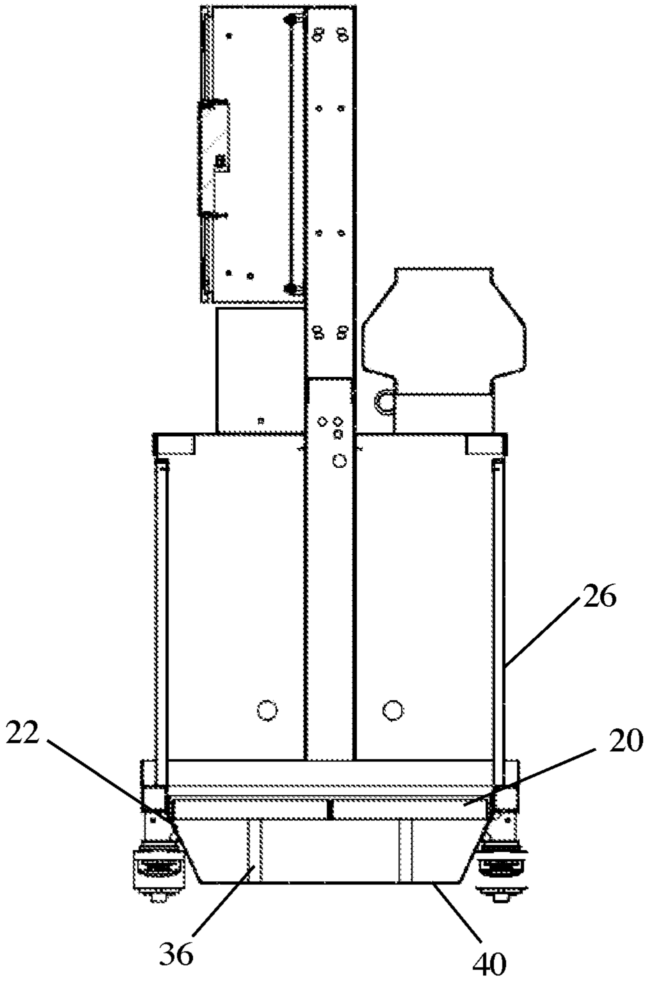
FIG. 6 is a side cross sectional view of a solvent containment system and cabinet.

FIG. 6 is a side cross sectional view of a vented solvent containment system and vented cabinet 26 through Section C-C' from FIG. 3. In the embodiment shown, the support surface 20 which supports one or more solvent tank has a plurality of apertures both in and around the support surface and as gaps along the interior perimeter of the side walls of the containment tray 22. Vertical support bars 36 supported by the base 40 of the containment tray 22 stabilize the support surface 20.

Figure 7:
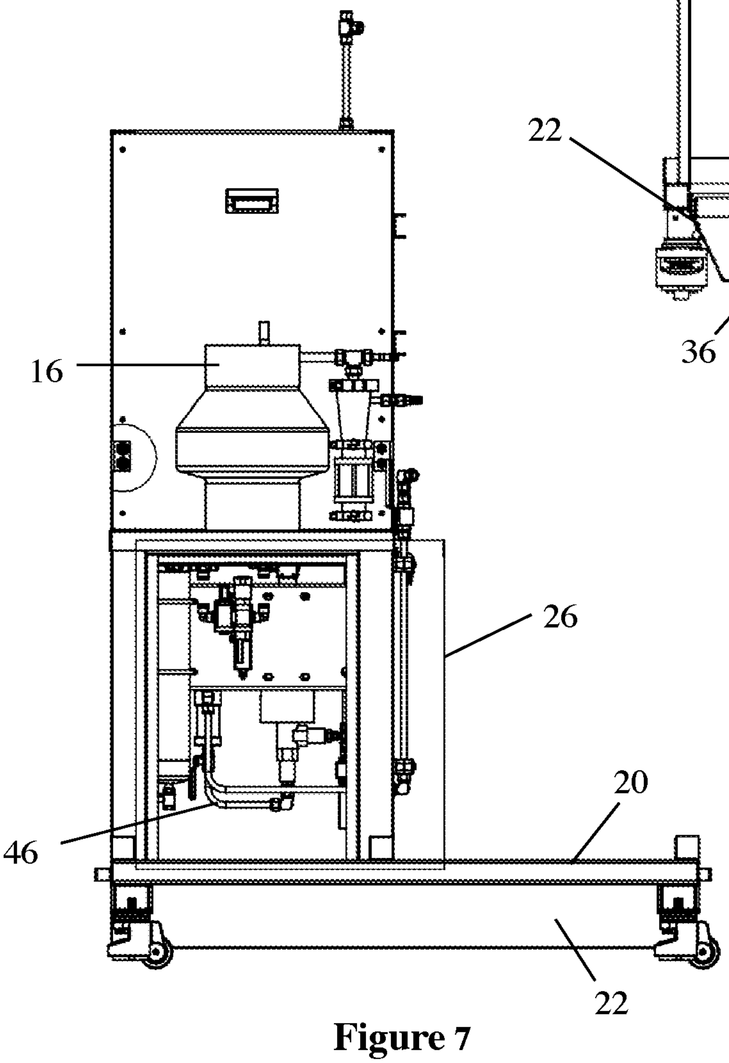
FIG. 7 is a side cross sectional view of a solvent containment system and cabinet.

FIG. 7 is a side cross sectional view of a vented solvent containment system and cabinet housing solvent conduits through Section B-B' from FIG. 3. Air is drawn from the room by the ventilation system through the support surface 20 and through containment tray 22. Vented cabinet 26 is an enclosed space housing solvent handling components 46 such as solvent conduits and solvent processing equipment and provides a secondary containment system for the capture of solvent vapor and adequate ventilation through ventilation duct 16. As shown, vented cabinet 26 comprises solvent conduits and solvent handling equipment, and air flow in the closed cabinet captures any leaked vapor into the exhaust system. Should a spill occur in the vented cabinet 26 containment tray 22 is sufficiently large to contain any fluid spill, and the bottom of the cabinet can be open to the containment tray 22 or have apertures that create a solvent path to the containment tray 22. One or more air flow regulator is fluidly connected to the ventilation duct to direct flow of solvent exhaust from the containment tray through the ventilation duct. The air flow regulator can be, for example, one or more propeller fan, centrifugal fan, turbine, vacuum pump, blower, or other air flow regulation device. The air flow regulator can be single speed, have a range of pre-set speeds, or allow continuously variable speed using, for example, variable frequency drive (VFDs). The ventilation system can also comprise one more filters, baffles, dampers, vanes, diffusers, shutters, or other air flow control devices. It is understood that proper air circulation into the room where the ventilation skid is placed is also important for maintaining an adequate make-up air supply into the room.

Figure 8:
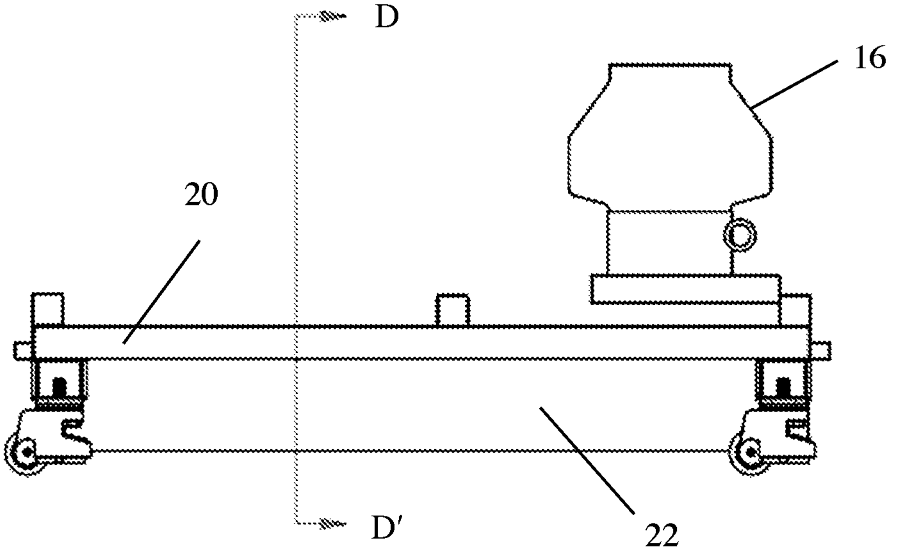
FIG. 8 is a side view of an alternative configuration of a vented containment skid.

FIG. 8 is a side view of an alternative configuration of a vented containment skid without a cabinet above support surface 20. Instead ventilation duct 16 draws air through the support surface 20, into the containment tray 22, and directly to the ventilation system for venting to the outside.

Figure 9:
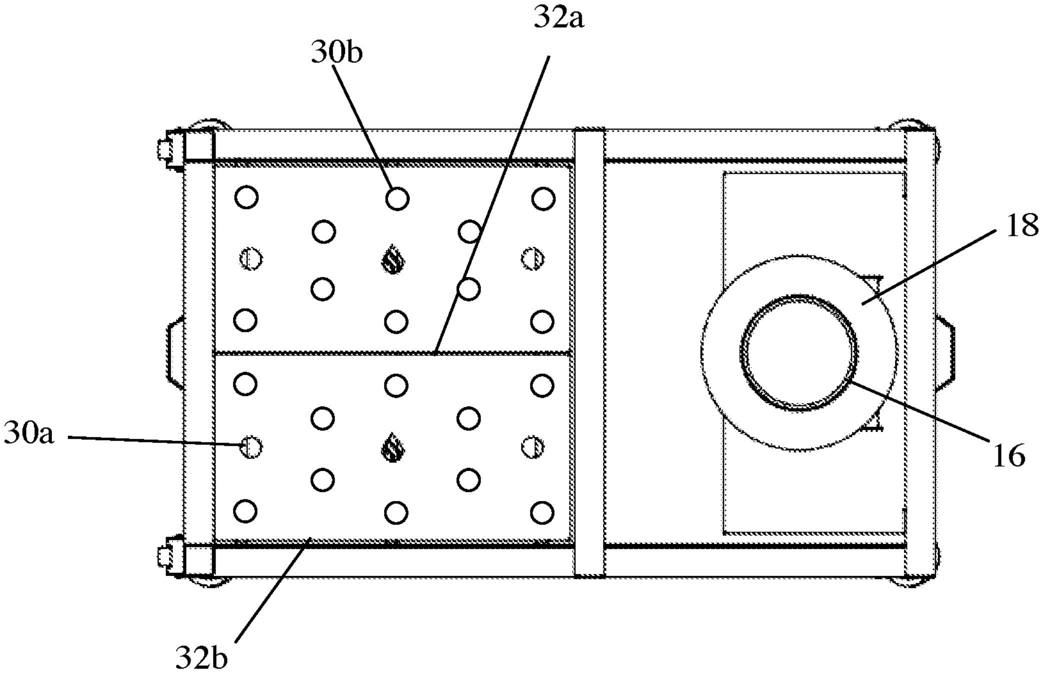
FIG. 9 is a top view of an alternative configuration of a vented containment skid.

FIG. 9 is a top view of the alternative configuration of a vented containment skid shown in FIG. 8. Two support surfaces are supported by a plurality of horizontal and vertical support bars in the containment tray, and can also be supported by surface or perimeter features in the containment tray, such as one or more protrusions, shelves, or other design features. The surface plates each have a plurality of hole apertures 30*a*, 30*b*, as well as gap aperture 32*a* between the plates and gap apertures 32*b* between the plate and the sidewalls of the containment tray. Ventilation duct 16 and air flow regulator 18 are fluidly connected to the volume defined by the sidewalls, base, and support surface of the containment tray to provide a negative pressure to draw air from above the support surface into the containment tray and out to an exhaust system through ventilation duct 16.

Figure 10:
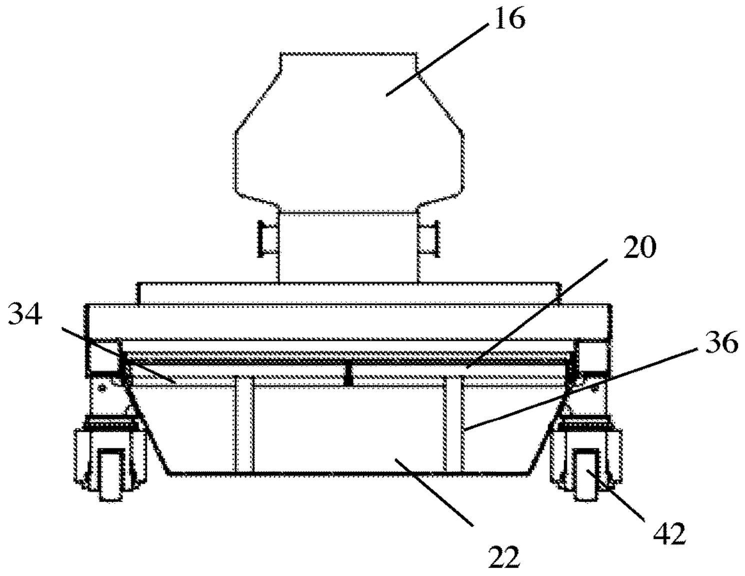
FIG. 10 is a side cross sectional view of a vented containment skid.

FIG. 10 is a side cross sectional view of a vented solvent containment skid through section D-D' from FIG. 8. The vented solvent containment skid has a containment tray 22 mounted on base supports 42. Support surface 20 is comprised of two surface plates with apertures therebetween and horizontal support bars 34 and vertical support bars 36 support the surface plates above the containment tray 22. Ventilation duct 16 having a negative air flow draws air through the support surface 20 and containment tray 22 and into the ventilation system for venting.

Figure 11:
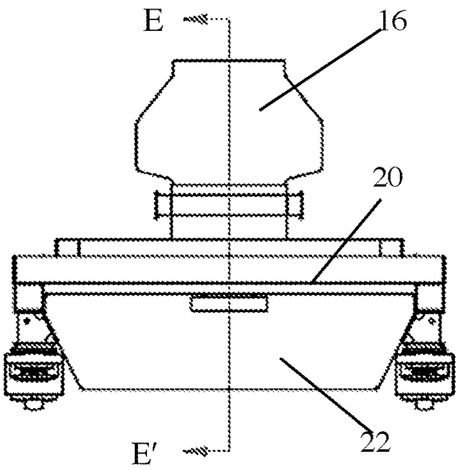
FIG. 11 is a front view of an alternative configuration of a vented containment skid.

FIG. 11 is a front view of an alternative configuration of the ventilated containment skid comprising containment tray 22 with support surface 20 supported on the containment tray 22 and a ventilation duct 16.

Figure 12:
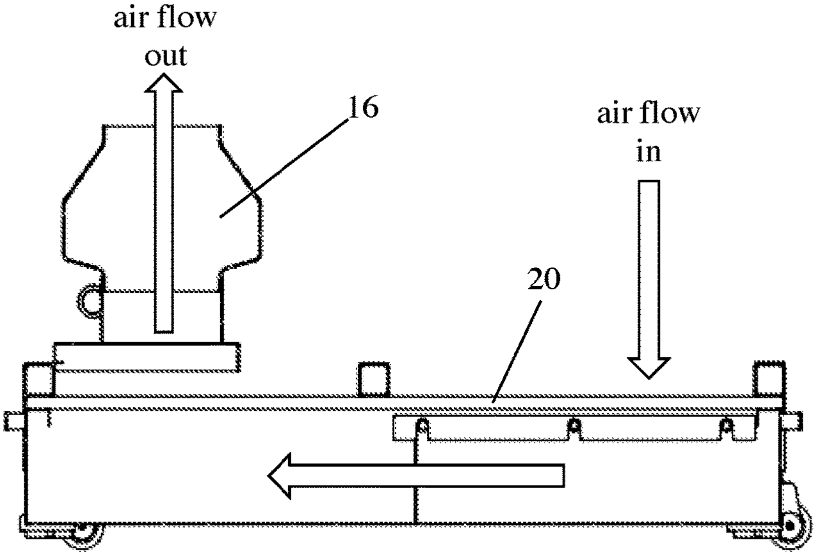
FIG. 12 is a cross sectional view of a vent skid showing air ventilation flow.

FIG. 12 is a cross sectional view through section E-E' from FIG. 11 showing air ventilation flow through the vent skid. Solvent vapor is directed from the top of the support surface 20 which can hold solvent containers to the containment tray by an air flow regulator and containment tray provides required secondary containment for the liquid solvent. A ventilation duct 16 is connected to air flow regulator and the ventilation duct 16 discharges the solvent exhaust safely to a remote location. Air flowing into the solvent containment skid is ambient room air, which is replenished by a room air supply ventilation system. It is understood that ventilation duct 16 shown is connected to a ventilation system and that that the air leaving ventilation duct 16 is directed through a series of connected ducts to a safe exhaust space. The solvent apertures of the support surface can comprise perforations, gaps, holes, mesh, be of a structure that allows fluid and vapor to flow through it, or have a combination of aperture features.

Figure 13A:
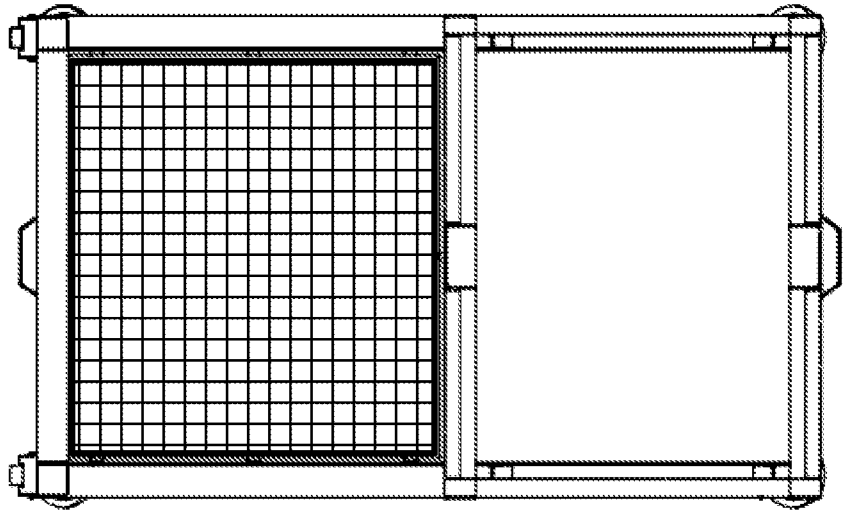
FIG. 13A is an alternative configuration of a vented support surface for a vented containment skid.

FIG. 13A is an alternative configuration of a vented support surface for a vented containment skid where the support surface is a mesh surface, such as a wire mesh or polymer mesh.

Figure 13B:
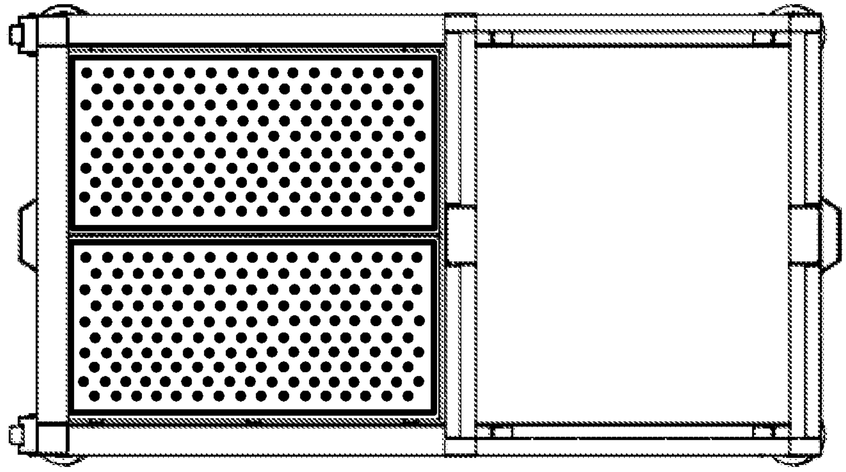
FIG. 13B is another alternative configuration of a vented support surface for a vented containment skid.

FIG. 13B is another alternative configuration of a vented support surface for a vented containment skid where the support surface comprises a three-dimensional solvent-resistant polymer structure that sits inside the containment tray but still provides air flow channels inside the structure.

Figure 14:
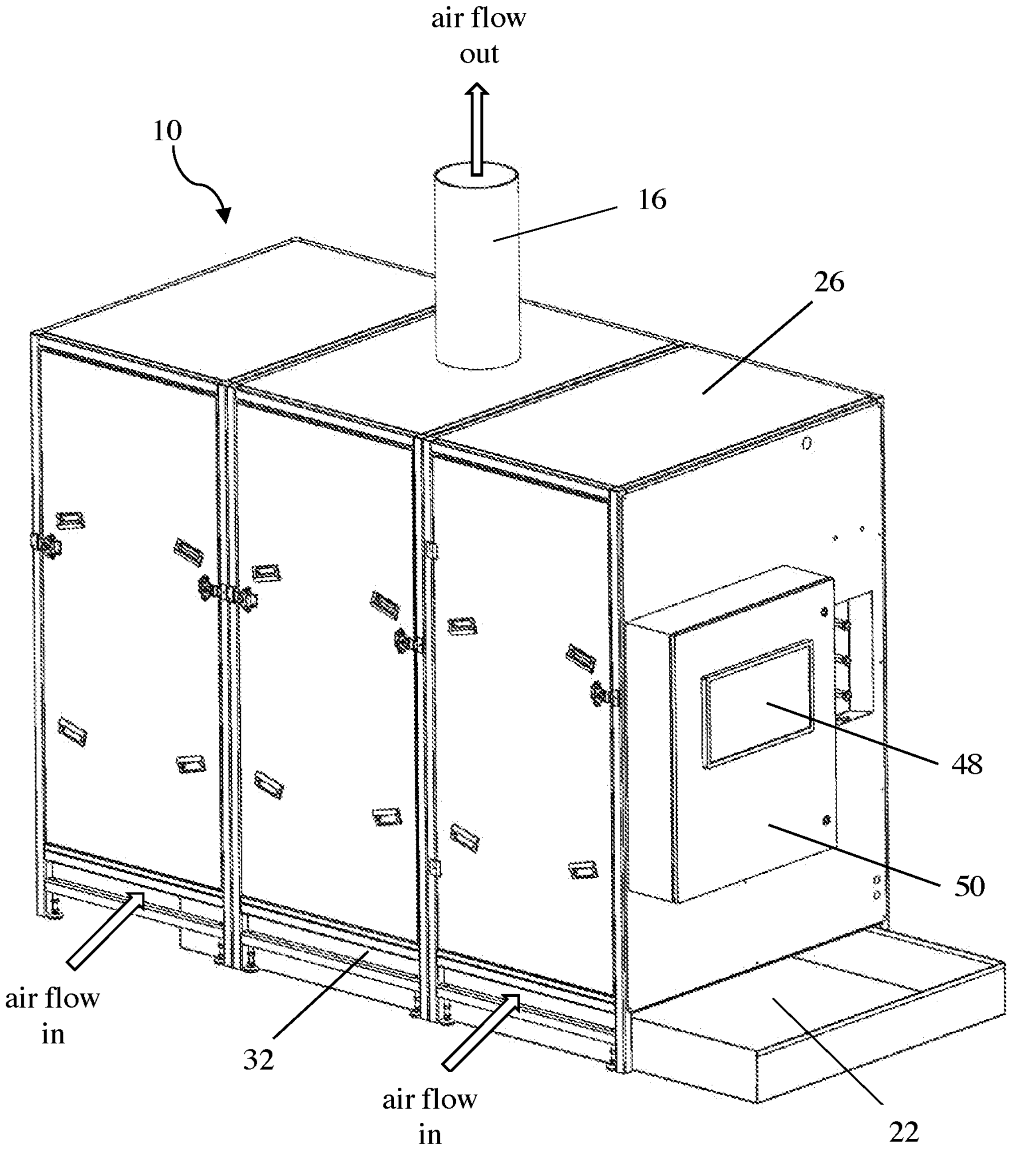
FIG. 14 is an isometric view of a large solvent containment system.

FIG. 14 is an isometric view of a solvent containment system 10 with a large vented cabinet 26. As a further example to how this invention can be used in different applications, the base of the solvent containment system can be entirely encapsulated by a solvent cabinet 26, which contains a volume of solvent inside solvent handling components which require ventilation and spill containment. The solvent containment system 10 has a containment tray 22 which rests below the vented cabinet 26 and has sufficient volume to capture all solvent contained in the solvent handling components inside the cabinet 26 to comply with solvent handling and spill mitigation regulations. The ventilation duct 16 is where negative air flow in the cabinet is directed and outbound air is directed to the top of the vented cabinet 26, connecting to an air flow regulator which will draw solvent exhaust from the containment tray 22 and cabinet interior safely to a remote area outside of the facility. In this embodiment the entirely of the space above the containment tray 22 is inside the vented cabinet 26. Open space or gap apertures 32 between the base of the side panels of the vented cabinet 26 and the lower containment tray 22 allows makeup air from the room to enter the vented cabinet and is drawn up through the vented cabinet to the ventilation system through the ventilation duct 16. The gap aperture(s) is sized to maintain the minimum capture velocity required for the solvent. In an embodiment, a sensor to measure ventilation capture velocity is located within the ventilation duct 16 which is interlocked with the control system for the solvent containment system. If the ventilation system is not operating or capture velocity is lower than the calibrated value then the interlock, equipment operation will cease. Signal from the air velocity sensor is sent to the solvent control system inside the control box to process and take action on the interlock should the air velocity decrease below the required setpoint. Notifications, alerts, or information on process management and status can be displayed on display panel 48.

Figure 15:
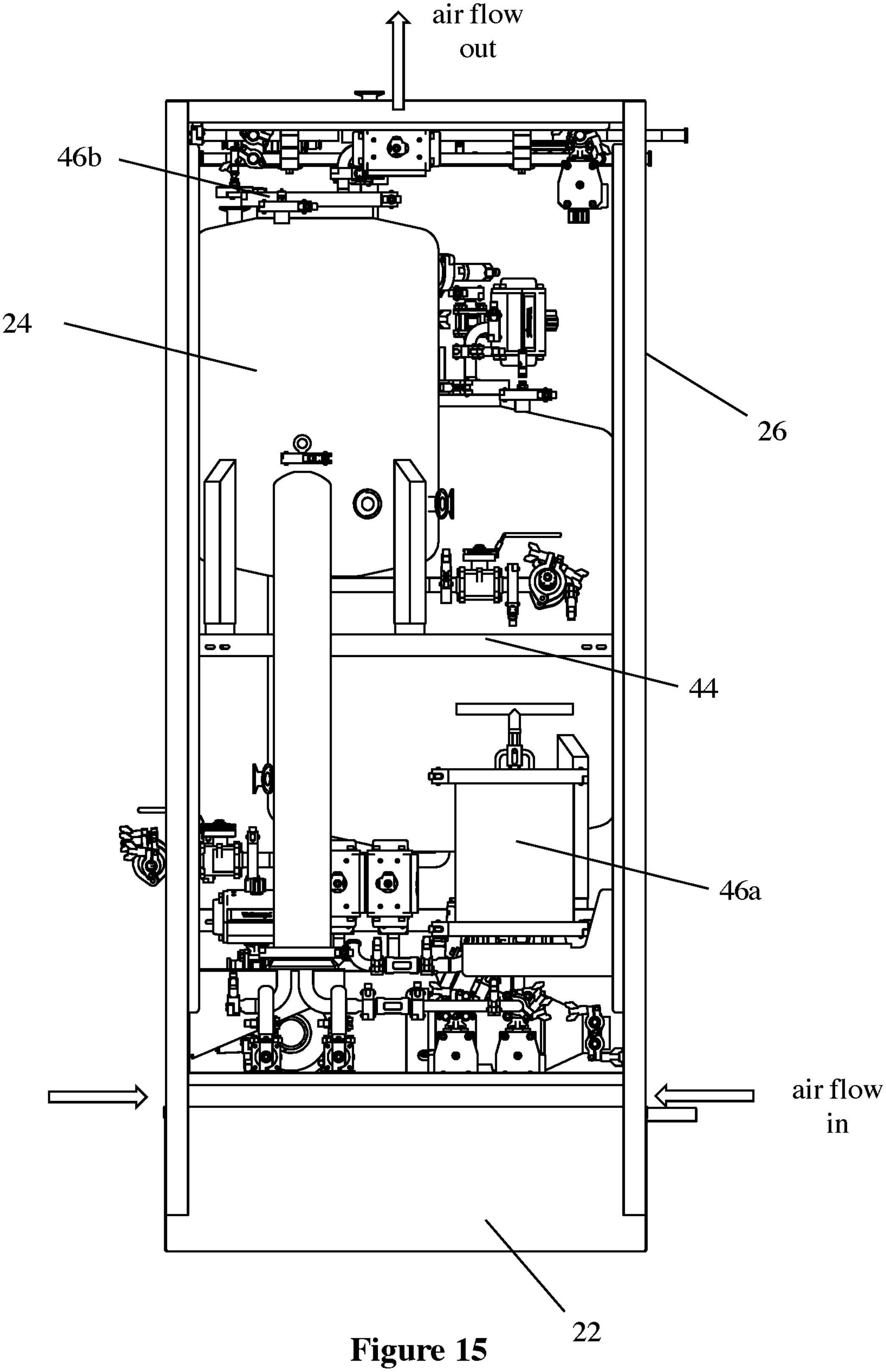
FIG. 15 is a side interior view of a solvent containment system with solvent control components.

FIG. 15 is a side interior view of a solvent containment system with solvent control components. The solvent containment system shown was designed as a cosolvent supply system for a superfluid extraction system. Vented cabinet 26 is positioned above solvent containment tray 22, which has the volume to hold any solvent that may leak from the solvent handling components inside the cabinet. Solvent handling components 46*a* (solvent pump) and 46*b* (solvent conduit) including solvent tank 24 can contain, process, and transport solvent as required. A support structure 44 inside the vented cabinet can be used to anchor and support solvent handling components in the solvent containment system. The support structure and/or cabinet walls or floor can also comprise one or more baffles to direct any leaking solvent into the containment tray. Air flows into the cabinet from the room through gap apertures or other apertures at the bottom of the cabinet and above the maximum fluid level of the solvent containment tray 22 to ensure that solvent levels inside the vented cabinet are maintained at safe levels. One or more sensors inside the cabinet to detect safe solvent containment system operation are interlocked with the control system for the solvent containment system such that solvent flow can be shut down in the event of a potentially hazardous situation.

Figure 16:
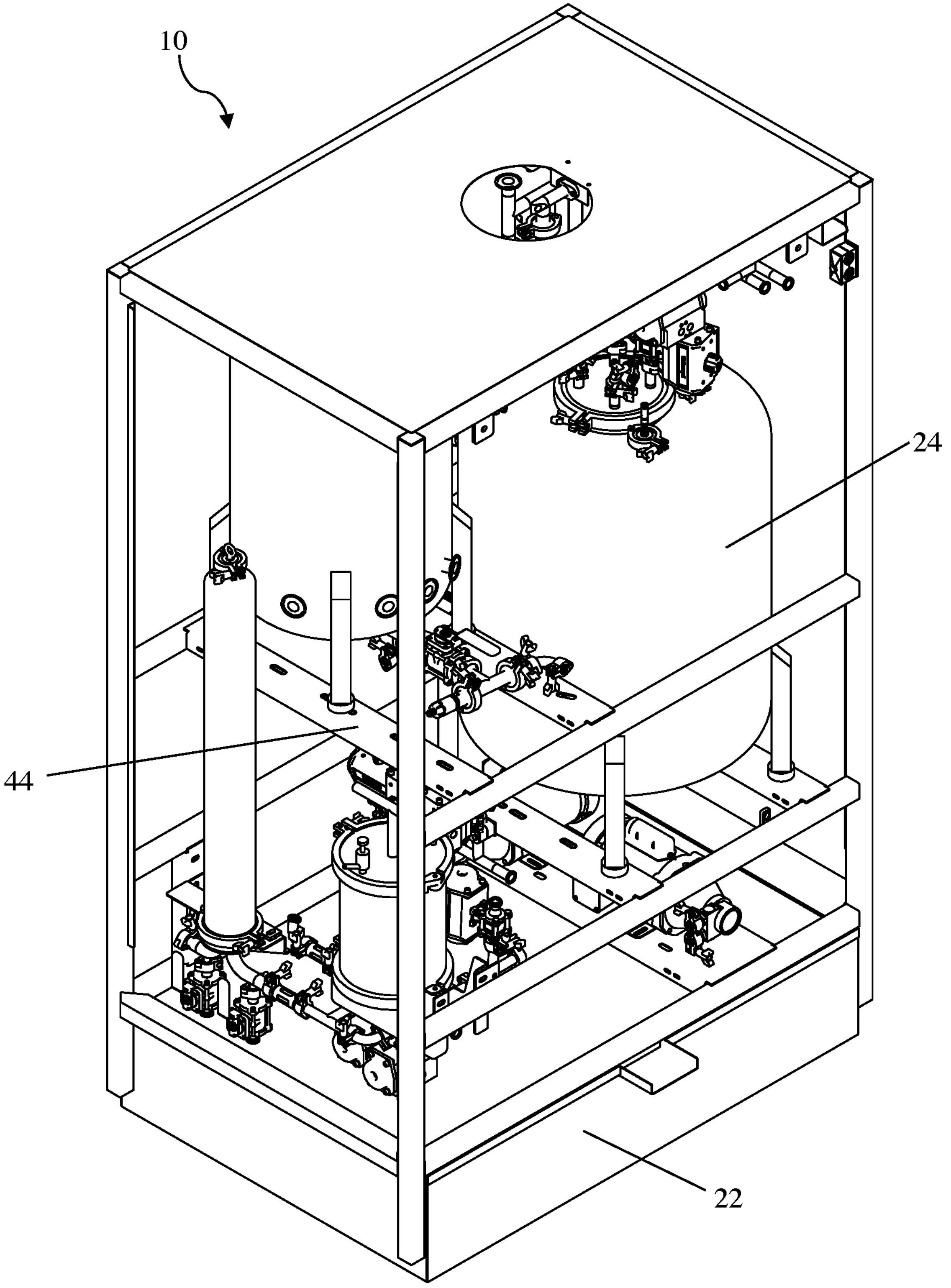
FIG. 16 is an isometric interior view of a solvent containment system with solvent control components.

FIG. 16 is an isometric interior view of the inside of a solvent containment system 10 with solvent handling components. Support structure 44 is shown with both horizontal and vertical components designed to support solvent handling components such as solvent tank 24. Solvent handling components are positioned above containment tray 22 such that, in the event of a solvent leak, any solvent can be captured in the containment tray 22 which serves as a secondary containment.

Figure 17:
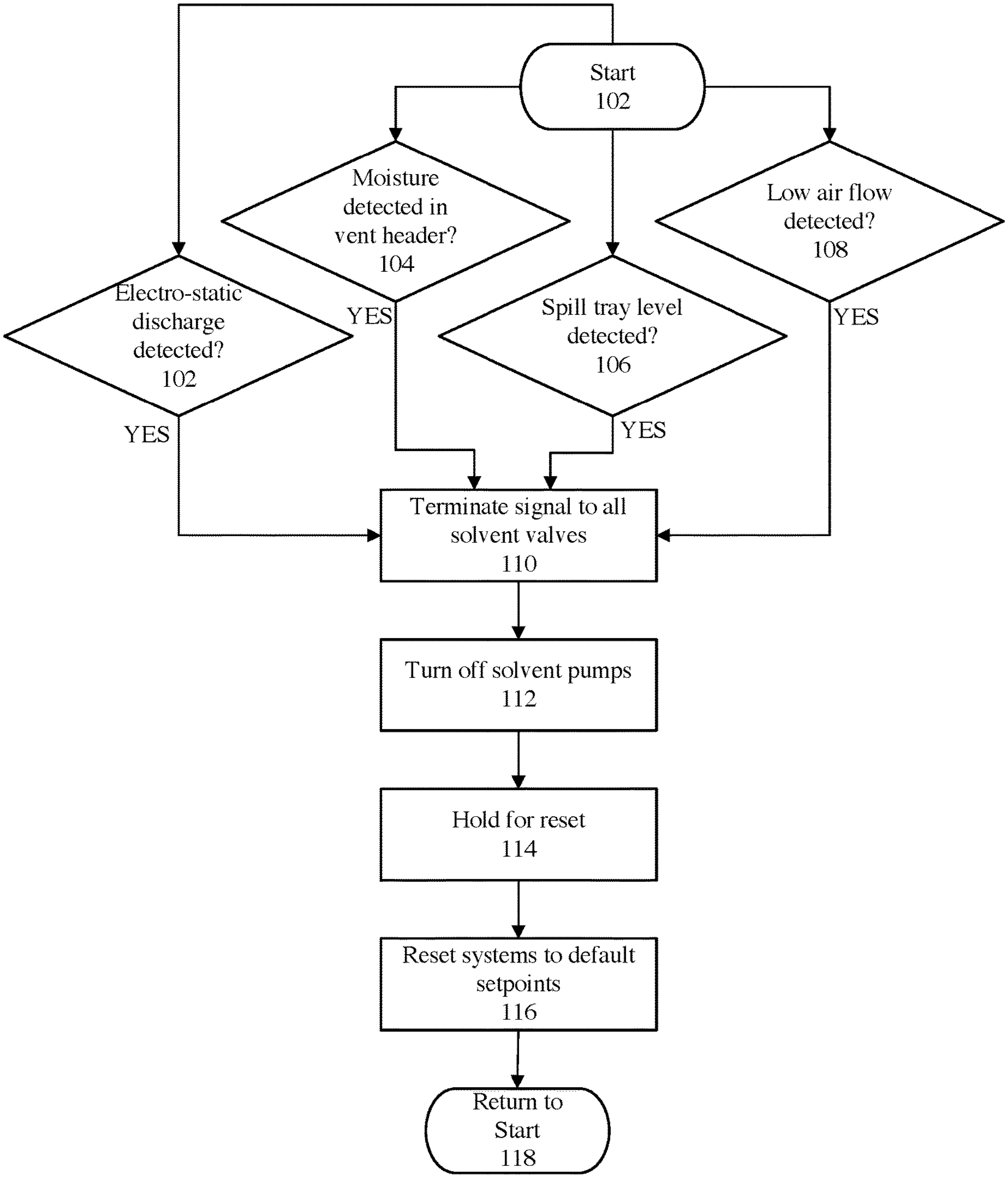
FIG. 17 is a interlock flowchart showing a solvent containment system with process interlocking.

FIG. 17 is an interlock flowchart showing a solvent containment system with process interlocking. The solvent containment system can have a plurality of interlocking features and safety sensors such that movement of solvent through solvent handling components is restricted, stopped, or not allowed to start if a hazardous system state is detected by one or more safety sensors. In the process interlocking system the interlocks are monitored continuously through the process to ensure that all controls are in place to allow solvent to be used safely. At the start 102 of the process or the start of a monitoring cycle each interlock is evaluated to determine whether it is within a safe level as set by the solvent containment system. Some examples of interlocked features are shown, for example detection of electrostatic discharge 102, moisture detection in a vent header 104, spill tray fluid level detection 106, and air flow velocity detection 108. The system can also comprise other or different process interlocks for detection of hazardous situations. These safety sensors can include but are not limited to solvent detection sensors, temperature sensors, light sensors, and position sensors for doors and/or other pieces of the assembly which could change the capture air flow velocities. A plurality of any type of sensor or detector can be used, for example the solvent containment system can have multiple moisture sensors at various locations in the vented solvent cabinet. Additionally the containment tray may be subdivided into a plurality of containers, and each container can have its own fluid level detector or sensor. The readings on each interlocked path as detected by its associated sensor is electronically sent to the control system of the solvent containment system. If all of the interlocked sensors and monitors are within normal range then the system will return to continuous monitoring and allow the solvent pumps and valves to operate normally. However if any of the interlocked sensors detects a level that is out of acceptable range the solvent containment system will terminate signals to all solvent valves 110 that allow solvent to flow through the system and turn off any solvent pumps 112 in order to stop solvent leakage. If the system shuts down due to an interlocked process signal detection the solvent containment system will hold for reset 114. Once the leak has been resolved and the system issue ameliorated the control systems are reset to default setpoints and the interlocked monitoring process can return to start 118.

In the event of a sudden rise in solvent in the solvent cabinet the process system can be further interlocked with safety processes to rapidly address a situation involving solvent leakage. These may include, for example, increasing air flow through the solvent cabinet by increasing ventilation, activating cooling systems, or injecting an asphyxiate into the solvent cabinet. In a hazardous environment with a hazardous room classification, certain regulatory requirements must be met to ensure safety, for example minimum air flow requirements. The present process interlocking in a contained space in a solvent containment system provides a higher level of monitoring and therefore safety protection such that any potentially hazardous situation is quickly detected, the situation is mitigated quickly, and any potential damage is reduced or eliminated. The present solvent containment and process interlocking system can be used in ordinary locations, as well as in hazardous workplaces where additional protection and monitoring is desired, providing an additional layer of protection to workplaces, increasing worker and property safety.

The present solvent containment and process interlocking system can also be used in combination with other solvent systems in a variety of industrial chemical and extractive processes. One example use is in combination with carbon dioxide superfluid extraction and processing activities to extract oils from plants, for example by processes including but not limited to extraction, winterization, evaporation, essential oil capture, chromatography, and distillation. Other applications may include in oil and natural gas capture and refinement.

All publications, patents and patent applications mentioned in this specification are indicative of the level of skill of those skilled in the art to which this invention pertains and are herein incorporated by reference. The reference to any prior art in this specification is not, and should not be taken as, an acknowledgement or any form of suggestion that such prior art forms part of the common general knowledge.

The invention being thus described, it will be obvious that the same may be varied in many ways. Such variations are not to be regarded as a departure from the scope of the invention, and all such modifications as would be obvious to one skilled in the art are intended to be included within the scope of the following claims.

We claim:

1. A solvent containment system comprising:

a vented cabinet comprising cabinet sidewalls and a cabinet top wall;

a liquid containment tray positioned below the vented cabinet comprising a tray base and tray sidewalls for enclosing a maximum liquid containment volume, at least part of the liquid containment tray fluidly connected to the vented cabinet;

a support surface extending between the sidewalls of the liquid containment tray and outside of the vented cabinet, the support surface comprising a plurality of apertures above the maximum liquid containment volume of the liquid containment tray such that ambient air is directed through the plurality of apertures into the liquid containment tray and into the vented cabinet;

a ventilation duct at or near the top of the vented cabinet connected to an air flow regulator to draw the ambient air through the plurality of apertures into the vented cabinet and out the ventilation duct to an exhaust system;

at least one solvent handling component inside the vented cabinet;

a solvent control system connected to the at least one solvent handling component, the solvent control system capable of controlling solvent flow in the at least one solvent handling component; and a safety sensor interlocked with the solvent control system such that a signal from the safety sensor indicating a potentially hazardous condition in the solvent containment system is sent to the solvent control system to mitigate the potentially hazardous condition.

2. The solvent containment system of claim 1, wherein the safety sensor is one or more of an air flow sensor, fluid level sensor, moisture sensor, temperature sensor, ultrasonic sensor, door sensor, and chemical sensor.

3. The solvent containment system of claim 1, further comprising one or more of a asphyxiate gas dispenser and a neutralizer dispenser.

4. The solvent containment system of claim 1, wherein the air flow regulator is capable of negative air flow velocities above the containment tray at least about 100 cubic feet per minute.

5. The solvent containment system of claim 1, wherein the safety sensor detects one or more of electrostatic discharge, moisture, containment tray fluid level, presence of solvent, temperature, an open door in the vented cabinet, light, and air flow velocity.

6. The solvent containment system of claim 1, further comprising a support structure inside the vented cabinet capable of supporting the at least one solvent handling component.

7. The solvent containment system of claim 1, wherein the support surface is capable of supporting a solvent container.

8. The solvent containment system of claim 1, wherein the apertures of the support surface comprise one or more perforation apertures, gap apertures, and mesh surfaces.

9. The solvent containment system of claim 1, further comprising an air flow control system to control the air flow regulator.

10. The solvent containment system of claim 1, wherein the maximum liquid containment volume of the containment tray is greater or equal to a solvent volume capacity of the at least one solvent handling component.

11. A method of solvent containment comprising:

containing a solvent handling component inside a solvent containment system comprising:

a vented cabinet comprising cabinet sidewalls and a cabinet top wall, the solvent handling component inside the vented cabinet;

a liquid containment tray positioned below the vented cabinet comprising a tray base and tray sidewalls for enclosing a maximum liquid containment volume, at least part of the liquid containment tray fluidly connected to the vented cabinet;

a support surface extending between the sidewalls of the liquid containment tray and outside of the vented cabinet, the support surface comprising a plurality of apertures above the maximum liquid containment volume of the liquid containment tray such that ambient air is directed through the plurality of apertures into the liquid containment tray and into the vented cabinet;

a ventilation duct at or near the top of the vented cabinet connected to an air flow regulator to draw the ambient air through the plurality of apertures into the vented cabinet and out the ventilation duct to an exhaust system; and a solvent control system connected to the solvent handling component, the solvent control system capable of controlling solvent flow in the solvent handling component;

monitoring an environmental factor inside the vented cabinet with at least one safety sensor;

controlling solvent flow in the solvent handling component with the solvent control system interlocked with the at least one safety sensor; and when the safety sensor detects a potentially hazardous condition, electronically sending a signal to the solvent control system to mitigate the potentially hazardous condition.

12. The method of claim 11, wherein the safety sensor detects one or more of electrostatic discharge, moisture, spill tray fluid level, presence of solvent, temperature, light, an open door in the vented cabinet, and air flow velocity.

13. The method of claim 11, wherein the safety sensor is monitoring continuously when solvent is flowing in the solvent handling component.

14. The method of claim 11, wherein the solvent handling component is a solvent pump, solvent tank, solvent conduit, valve, valve manifold, extraction column, or chromatography column.

15. The method of claim 11, wherein mitigating the potentially hazardous condition comprises increasing air flow velocity to the vented cabinet.

16. The method of claim 11, wherein mitigating the potentially hazardous condition comprises slowing or stopping solvent flow in the solvent handling component.

17. The method of claim 16, further comprising waiting until the safety sensor no longer detects the potentially hazardous condition, resetting the solvent control system, and reenabling solvent flow in the solvent handling component.

18. The solvent containment system of claim 1, wherein the at least one solvent handling component is a solvent pump, solvent tank, extractor, solvent mixing device, fluid line, conduit fitting, solvent conduit, valve, valve manifold, extraction column, or chromatography column.

* * * * *